(12) United States Patent
Shirahashi et al.

(10) Patent No.: US 10,844,805 B2
(45) Date of Patent: Nov. 24, 2020

(54) ENGINE SYSTEM

(71) Applicant: Mazda Motor Corporation, Hiroshima (JP)

(72) Inventors: Naotoshi Shirahashi, Hiroshima (JP); Yasunori Uesugi, Hiroshima (JP); Takeshi Matsubara, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/751,152

(22) Filed: Jan. 23, 2020

(65) Prior Publication Data

US 2020/0240351 A1    Jul. 30, 2020

(30) Foreign Application Priority Data

Jan. 29, 2019  (JP) .................. 2019-013584

(51) Int. Cl.
*F02D 41/40* (2006.01)
*F02D 41/30* (2006.01)
(Continued)

(52) U.S. Cl.
CPC ....... *F02D 41/402* (2013.01); *F02D 41/3035* (2013.01); *F02B 23/104* (2013.01);
(Continued)

(58) Field of Classification Search
CPC .. F02D 41/402; F02D 41/3035; F02D 35/023; F02D 41/401; F02D 2041/389; F02D 2200/101; F02D 2200/1002; F02D 2200/0602; F02D 41/405; F02D 41/403; F02B 23/104; F02B 2075/125; F02B 2275/14; F02B 23/0693; F02B 2023/103; F02B 23/101; F02B 23/0672; F02B 23/0669

See application file for complete search history.

(56) References Cited

U.S. PATENT DOCUMENTS

| 8,156,927 B2* | 4/2012 | Iikubo | F02B 23/0672 123/661 |
| 2012/0192828 A1* | 8/2012 | Schulz | F02B 23/0693 123/193.6 |

(Continued)

FOREIGN PATENT DOCUMENTS

JP    2010101243 A    5/2010

*Primary Examiner* — Xiao En Mo
(74) *Attorney, Agent, or Firm* — Alleman Hall Creasman & Tuttle LLP

(57) ABSTRACT

In a compression-ignition engine having a two-stage cavity, the distribution ratio between fuel for an upper cavity and fuel for a lower cavity is maintained even when the operational state of the engine changes. A piston of the engine includes a lower cavity, an upper cavity, and a lip portion therebetween. A controller causes a main injection and at least one pilot injection to be executed when the engine operates in a first state and a second state in which the load is lower than the load in the first state. The fuel spray is distributed to the lower cavity and the upper cavity. The controller sets the timing of the pilot injection(s) so that the distribution ratio of the fuel spray of the pilot injection(s) for the lower cavity is higher when the engine operates in the first state than when in the second state.

10 Claims, 15 Drawing Sheets

(51) Int. Cl.
*F02B 23/10* (2006.01)
*F02B 75/12* (2006.01)
*F02D 35/02* (2006.01)
*F02D 41/38* (2006.01)

(52) U.S. Cl.
CPC ..... *F02B 2075/125* (2013.01); *F02B 2275/14* (2013.01); *F02D 35/023* (2013.01); *F02D 41/401* (2013.01); *F02D 2041/389* (2013.01)

(56) References Cited

U.S. PATENT DOCUMENTS

| | | | |
|---|---|---|---|
| 2012/0234285 A1* | 9/2012 | Venugopal | F02B 23/0669 123/193.6 |
| 2013/0036998 A1* | 2/2013 | Cornwell | F02B 23/0693 123/193.6 |
| 2016/0138461 A1* | 5/2016 | Ono | F02B 23/0693 123/294 |
| 2016/0195028 A1* | 7/2016 | Redon | F02D 19/0602 123/299 |
| 2017/0145901 A1* | 5/2017 | Uehara | F02B 23/0669 |
| 2017/0159549 A1* | 6/2017 | Uehara | F02B 23/0672 |
| 2020/0240332 A1* | 7/2020 | Shirahashi | F02D 1/16 |
| 2020/0240352 A1* | 7/2020 | Shirahashi | F02D 41/403 |
| 2020/0240353 A1* | 7/2020 | Shirahashi | F02B 1/12 |

\* cited by examiner

ENGINE SYSTEM

BACKGROUND OF THE INVENTION

Field of the Invention

The technology disclosed herein relates to a control apparatus of a compression-ignition engine.

Description of the Related Art

Japanese Patent Laid-Open No. 2010-101243 discloses a diesel engine in which a first cavity, a second cavity, and a protruding portion are provided in a piston.

Fuel spray jetted out from a fuel injection nozzle is distributed to the first cavity and the second cavity by the protruding portion. The air utilization rate of an engine having a so-called two-stage cavity can be increased, and hence the engine is advantageous in terms of improving fuel efficiency and producing cleaner exhaust gas.

The applicant of the present application has realized rapid multi-stage combustion in which the change of the heat generation rate with respect to the progress of the crank angle forms a hill due to the heat generation of the pre-combustion and the heat generation of the main combustion being in smooth succession in the compression-ignition engine. The rapid multi-stage combustion can be realized by performing at least one pilot injection and a main injection. The rapid multi-stage combustion can improve thermal efficiency and improve emission performance while suppressing the increasement of combustion noise. By performing rapid multi-stage combustion by the compression-ignition engine, an automobile in which the engine is installed can realize a high degree of quietness, lower fuel consumption, and cleaner exhaust gas.

The intent of the inventors of the present application is to perform the rapid multi-stage combustion in the compression-ignition engine having a two-stage cavity. When the fuel spray injected from the fuel injection valve is distributed to an upper cavity and a lower cavity at a predetermined ratio by a lip portion between the upper cavity and the lower cavity, the rapid multi-stage combustion can be realized. When the rapid multi-stage combustion is realized in the compression-ignition engine having a two-stage cavity, lower fuel consumption and cleaner exhaust gas are further improved in the automobile in which the engine is installed.

However, when the speed of the engine and/or the load of the engine changes, the total fuel amount injected to the combustion chamber, the injection pressure thereof, and the pressure in the combustion chamber change. Therefore, when the speed of the engine and/or the load of the engine changes, a property (for example, penetration) of the fuel spray injected into the combustion chamber by the fuel injection valve and the environment (for example, pressure) in the combustion chamber changes. When the property of the fuel spray and the environment in the combustion chamber changes, the distribution ratio of the fuel between the upper cavity and the lower cavity changes. As a result, the rapid multi-stage combustion is not realized. In other words, even when the rapid multi-stage combustion is intended to be performed in an engine having a two-stage cavity, the rapid multi-stage combustion can only be realized in an extremely limited operational state.

The technology disclosed herein maintains, in the compression-ignition engine having a two-stage cavity, the distribution ratio between the fuel for the upper cavity and the fuel for the lower cavity even when the operational state of the engine changes.

SUMMARY OF THE INVENTION

An engine system disclosed herein includes: a piston that is internally inserted in a cylinder of an engine and moves back and forth in the cylinder; a fuel injection valve that is disposed on a top surface of a combustion chamber formed by the cylinder and the piston, and injects fuel spray along an injection axis; a plurality of sensors that output measurement signals in accordance with various parameters relating to operation of the engine; a controller that receives the measurement signals of the plurality of sensors, and outputs a control signal to the fuel injection valve in accordance with an operational state defined by a speed and a load of the engine determined from the measurement signals; and a fuel pressure regulator that increases an injection pressure of the fuel when a total injection amount of the fuel injected to the combustion chamber during one combustion cycle increases.

The piston includes: a lower cavity provided in a central portion of a top surface of the piston in a radial direction; an upper cavity that is provided around the lower cavity and is shallower than the lower cavity; and a lip portion between the lower cavity and the upper cavity, the controller causes the fuel injection valve to execute a main injection performed near a compression top dead center, and at least one pilot injection performed during the compression stroke when the engine operates in a first state and a second state in which the load is lower than the load in the first state, the main injection and the at least one pilot injection distribute the fuel spray to the lower cavity and the upper cavity by directing the injection axis to the lip portion in at least one part of an injection period, and the controller sets a timing of the pilot injection in such a manner that a distribution ratio of the fuel spray of the at least one pilot injection for the lower cavity is higher when the engine operates in the second state than when the engine operates in the first state. The timing of the pilot injection may include a start timing and/or an end timing.

The combustion chamber of the engine has a two-stage cavity. The engine performs at least one pilot injection and the main injection when the engine operates in the first state and the second state. The fuel spray of the at least one pilot injection is distributed to the upper cavity and the lower cavity, and the fuel spray of the main injection is also distributed to the upper cavity and the lower cavity. The engine can realize the rapid multi-stage combustion when the engine operates in the first state and the second state.

When the load of the engine is high, the total injection amount increases. The fuel pressure regulator increases the injection pressure. When the load of the engine is high due to the increase of the total injection amount and the increase of the injection pressure, the penetration of the fuel spray injected from the fuel injection valve is high. When the penetration of the fuel spray is high, the time required for the piston to reach the lip portion is shorter. When the penetration of the fuel spray of the main injection near the compression top dead center is high, the fuel spray reaches the lip portion before the piston is separated from the fuel injection valve, and hence the fuel spray hits a portion of the lip portion near the lower cavity. The distribution of the fuel to the lower cavity increases, and the distribution of the fuel to the upper cavity decreases.

When the load of the engine is low, the penetration of the fuel spray injected from the fuel injection valve is low. When the penetration of the fuel spray is low, the time required for the piston to reach the lip portion is longer. When the penetration of the fuel spray of the main injection near compression top dead center is low, the piston is separating from the fuel injection valve at the time point at which the fuel spray reaches the lip portion, and hence the fuel spray hits a portion of the lip portion near the upper cavity. The distribution of the fuel to the lower cavity decreases, and the distribution of the fuel to the upper cavity increases.

When the engine operates in the second state, the load is relatively low. With regard to the fuel spray of the main injection, the distribution to the upper cavity increases and the distribution to the lower cavity decreases. Thus, the controller sets the timing of the at least one pilot injection so that the distribution ratio of the fuel spray of the at least one pilot injection for the lower cavity increases.

When the timing of the at least one pilot injection changes, the distance between the fuel injection valve and the piston at the timing of injecting the fuel changes. The position at which the fuel spray injected from the fuel injection valve hits the lip portion changes. When the position at which the fuel spray hits the lip portion changes, the distribution ratio between the fuel for the upper cavity and the fuel for the lower cavity changes. When the timing of the at least one pilot injection is set, as appropriate, the fuel spray of the at least one pilot injection can be distributed to the lower cavity by a larger amount. The distribution ratio between the fuel for the upper cavity and the fuel for the lower cavity becomes a predetermined ratio by complementing the at least one pilot injection and the main injection with each other when the engine operates in the second state.

When the engine operates in the first state, the load is relatively high. With regard to the fuel spray of the main injection, the distribution to the lower cavity increases and the distribution to the upper cavity decreases. The controller sets the timing of the at least one pilot injection so that the distribution ratio of the fuel spray of the at least one pilot injection for the lower cavity decreases unlike the above. As a result, the distribution ratio between the fuel for the upper cavity and the fuel for the lower cavity becomes a predetermined ratio as with the case where the engine operates in the second state.

Therefore, the distribution ratio between the fuel for the upper cavity and the fuel for the lower cavity is maintained at a predetermined ratio even when the load of the engine changes. The rapid multi-stage combustion can be realized even when the load of the engine changes. The automobile in which the engine is installed can realize a high degree of quietness, lower fuel consumption, and cleaner exhaust gas.

The controller may set the timing of the at least one pilot injection to be later when the engine operates in the second state than when the engine operates in the first state.

When the timing of the at least one pilot injection is set to be later, the piston performs the at least one pilot injection at a timing when close to the fuel injection valve, and hence the fuel spray hits a portion in the lip portion near the lower cavity. In this case, the fuel spray is distributed to the lower cavity by a larger amount.

The controller may cause a ratio of an injection amount per pilot injection to the total injection amount to be higher when the engine operates in the second state than when the engine operates in the first state.

When the engine operates in the second state, the load is relatively low, and hence the total injection amount is small. The fuel pressure regulator lowers the injection pressure. The injection amount of the pilot injection is smaller than that of the main injection, and hence the penetration of the fuel spray of the at least one pilot injection when the engine operates in the second state decreases as compared to when the engine operates in the first state. There is a concern that the fuel spray of the at least one pilot injection is not distributed to the upper cavity and the lower cavity at a desired ratio.

Thus, the controller causes the ratio of the injection amount per pilot injection to the total injection amount to be higher when the engine operates in the second state than when the engine operates in the first state. The penetration of the fuel spray per pilot injection increases. When the engine operates in the second state, the fuel spray of the at least one pilot injection is distributed at a desired ratio for the upper cavity and the lower cavity.

The engine system may further include a turbocharger that boosts intake air by exhaust energy of the engine. In the engine system, the controller may cause the ratio of the injection amount per pilot injection to the total injection amount to be lower when the engine operates in a third state than when the engine operates in the second state, the third state being a state in which the load is lower than the load in the first state and the speed is lower than the speed in the second state.

When the speed of the engine increases, the boost pressure of the turbocharger increases and the pressure in the combustion chamber increases. Because the pressure in the combustion chamber is high, the fuel spray scatters less easily.

Meanwhile, when the speed of the engine decreases, the boost pressure decreases and the pressure in the combustion chamber decreases. Because the pressure in the combustion chamber is low, the fuel spray easily scatters.

When the engine operates in the third state, the speed is relatively low. The pressure in the combustion chamber is low, and hence the fuel spray easily scatters. When the fuel spray easily scatters, the fuel spray hits a portion near the upper cavity in the lip portion of the piston approaching the fuel injection valve. With regard to the fuel spray of the at least one pilot injection, when the engine operates in the third state, there is a concern that the distribution of the fuel to the upper cavity becomes higher and the distribution of the fuel to the lower cavity becomes lower than when the engine operates in the second state. There is a concern that a gap is formed between the distribution ratio of the fuel spray of the at least one pilot injection between the upper cavity and the lower cavity in the second state and the distribution ratio of the fuel spray of the at least one pilot injection between the upper cavity and the lower cavity in the third state.

Thus, when the engine operates in the third state, the controller sets the distribution ratio of the fuel spray of the at least one pilot injection for the lower cavity to be higher than when the engine operates in the second state. Specifically, the ratio of the injection amount per pilot injection to the total injection amount is reduced.

When the injection amount per pilot injection decreases, the penetration of the fuel spray becomes lower. The fuel spray of the at least one pilot injection scatters less easily, and hence hits a portion in the lip portion near the lower cavity. The fuel spray is distributed to the lower cavity by a larger amount. The distribution ratio of the fuel spray of the at least one pilot injection for the upper cavity and the lower cavity is equal or substantially equal for when the engine operates in the second state and for when the engine operates in the third state.

Therefore, even when the speed of the engine changes, the fuel spray of the at least one pilot injection and the main injection is distributed to the upper cavity and the lower cavity at a predetermined ratio. As described above, even when the load of the engine changes, the fuel spray of the at least one pilot injection and the main injection is distributed to the upper cavity and the lower cavity at a predetermined ratio. The engine can realize the rapid multi-stage combustion even when the speed of the engine and/or the load of the engine changes. The automobile in which the engine is installed can realize a high degree of quietness, lower fuel consumption, and cleaner exhaust gas.

The controller may cause the main injection to be executed at a predetermined timing after the compression top dead center when the engine operates in the first state and when the engine operates in the second state.

The timing of the main injection is a predetermined timing after the compression top dead center regardless of whether the load of the engine is high or low. The timing of the main injection does not change, and hence a high thermal efficiency of the engine can be maintained. This configuration is advantageous in terms of improving fuel efficiency of the automobile.

While the timing of the main injection is not changed, the distribution ratio of the fuel spray of the main injection is changed because the penetration of the fuel spray changes when the load of the engine changes as described above. However, the at least one pilot injection complements the change in the distribution ratio of the fuel spray of the main injection, and hence the distribution ratio between the fuel for the upper cavity and the fuel for the lower cavity is maintained at a predetermined ratio even when the load of the engine changes.

The lower cavity may have a larger capacity than the upper cavity, and the controller may set the timing of the main injection in such a manner that the fuel spray of the main injection is distributed in correspondence to a capacity ratio between the upper cavity and the lower cavity when the engine operates in the first state.

When the fuel spray of the main injection is distributed in correspondence to the capacity ratio between the lower cavity and the upper cavity, the air utilization rate improves. Fuel efficiency of the engine improves, and the exhaust gas becomes cleaner.

When the engine operates in the second state, there is a gap between the distribution ratio of the fuel spray of the main injection and the capacity ratio between the lower cavity and the upper cavity. However, by complementing the gap in the distribution ratio of the fuel spray of the main injection with the at least one pilot injection, the distribution ratio of the fuel spray of the at least one pilot injection and the main injection for the upper cavity and the lower cavity corresponds to the capacity ratio between the lower cavity and the upper cavity. Even when the load of the engine changes, the air utilization rate improves, and the improvement of fuel efficiency of the engine and production of cleaner exhaust gas are realized.

As described above, in the engine system, the distribution ratio between the fuel for the upper cavity and the fuel for the lower cavity does not change even when the load of the engine changes.

DETAILED DESCRIPTION OF THE PREFERRED EMBODIMENT

An embodiment of an engine system is described below with reference to the accompanying drawings. The engine system described below is an example.

Overall Configuration of Engine System

Figure 1:
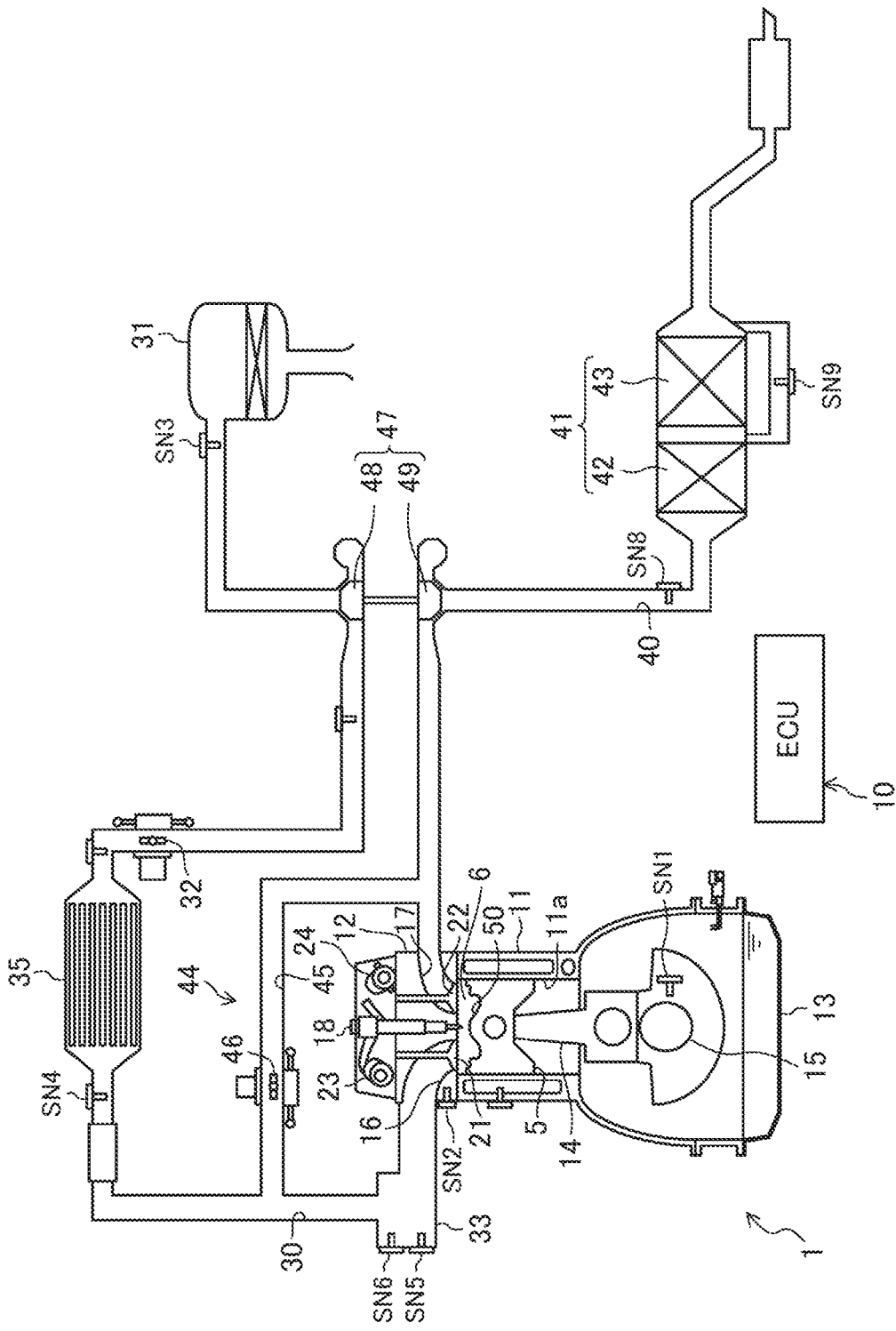
FIG. 1 illustrates a configuration example of a diesel engine system.

FIG. 1 exemplifies the overall configuration of an engine system. The engine system is installed in a four-wheeled automobile. The engine system includes an engine 1, an intake passage 30, an exhaust passage 40, an exhaust gas purification apparatus 41, an EGR (exhaust gas recirculation) apparatus 44, and a turbocharger 47.

The engine 1 is a diesel engine to which fuel containing light oil as the main component thereof is supplied. The fuel is combusted by compression ignition. The automobile travels by the operation of the engine 1. The engine 1 includes a cylinder block 11, a cylinder head 12, and an oil pan 13. In the cylinder block 11, a plurality of cylinders 11a (only one is illustrated in FIG. 1) are provided. The cylinder head 12 is disposed on the cylinder block 11. The oil pan 13 is disposed below the cylinder block 11. Lubricating oil is accumulated in the oil pan 13.

In each cylinder 11a, a piston 5 is internally inserted. The piston 5 moves back and forth in the cylinder 11a. The piston 5 is connected to a crankshaft 15 via a connecting rod 14. The piston 5, the cylinder 11a, and the cylinder head 12 form a combustion chamber 6.

Figure 3:
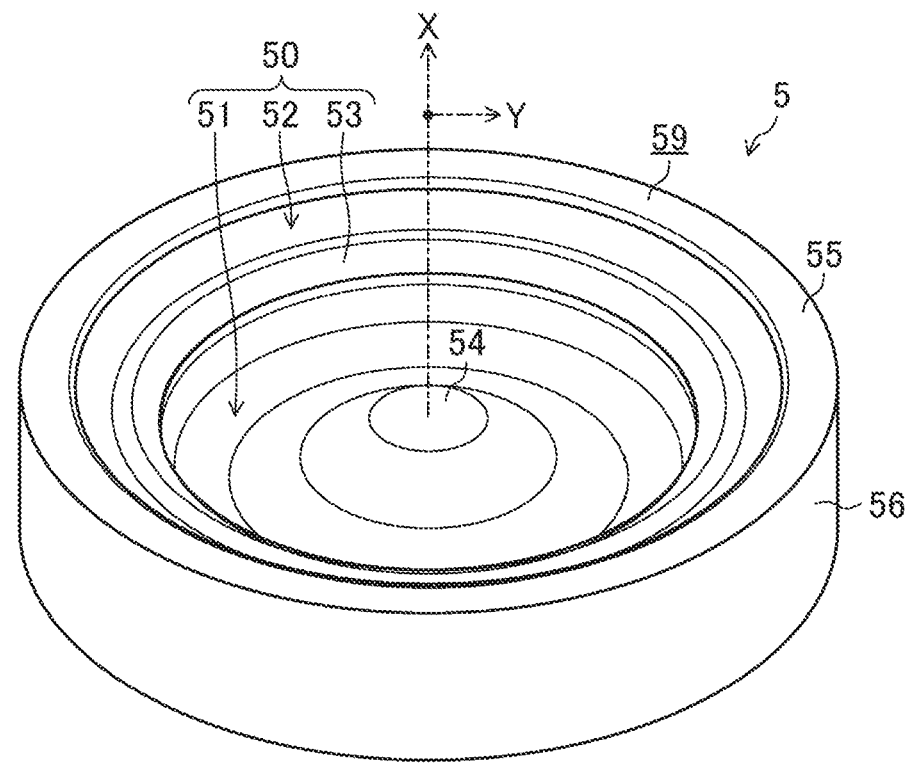
FIG. 3 is a perspective view exemplifying a top surface portion of a piston of the diesel engine.

As illustrated in FIG. 3, a cavity 50 is formed in a top surface 59 of the piston 5. Details of the shape of the cavity 50 are described below.

In the engine 1, a crank angle sensor SN1 and a water temperature sensor SN2 are mounted. The crank angle sensor SN1 outputs a measurement signal in accordance with the rotation of the crankshaft 15. The water temperature sensor SN2 outputs a measurement signal in accordance with the temperature of the cooling water flowing in the cylinder block 11 and the cylinder head 12.

In the cylinder head 12, an intake port 16 and an exhaust port 17 are formed for each cylinder 11a. In the intake port 16, an intake valve 21 that opens and closes the opening of the combustion chamber 6 is disposed. In the exhaust port 17, an exhaust valve 22 that opens and closes the opening of the combustion chamber 6 is disposed.

In the cylinder head 12, an intake valve mechanism 23 and an exhaust valve mechanism 24 are disposed. The intake valve mechanism 23 opens and closes the intake valve 21 in synchronization with the rotation of the crankshaft 15. The exhaust valve mechanism 24 opens and closes the exhaust valve 22 in synchronization with the rotation of the crankshaft 15. The intake valve mechanism 23 includes an intake S-VT (Sequential-Valve Timing) that can continuously change the opening and closing timings of the intake valve 21. The exhaust valve mechanism 24 includes an exhaust S-VT that can continuously change the opening and closing timings of the exhaust valve 22.

In the cylinder head 12, injectors 18 are mounted. Each injector 18 is a fuel injection valve that injects fuel spray into the combustion chamber 6. The injector 18 is mounted for each cylinder 11a.

Each injector 18 is connected to a common rail for pressure accumulation via a fuel supplying pipe (not shown). The common rail accumulates high-pressure fuel pressurized by a fuel pump (not shown). By supplying fuel hydraulically accumulated in the common rail to the injector 18 of each cylinder 11a, the injector 18 injects high-pressure fuel (for example, from 50 MPa to 250 MPa) into the combustion chamber 6. A fuel pressure regulator 19 for changing the pressure (that is, the injection pressure) of the fuel to be injected by the injector 18 is provided between the fuel pump and the common rail (see FIG. 2). The fuel pressure regulator 19 increases the injection pressure when the total injection amount of the fuel injected to the combustion chamber 6 during one combustion cycle increases.

The intake passage 30 is connected to one side surface of the engine 1. The intake passage 30 communicates with the intake port 16 of each cylinder 11a. The intake passage 30 guides air to each combustion chamber 6. The exhaust passage 40 is connected to another side surface of the engine 1. The exhaust passage 40 communicates with the exhaust port 17 of each cylinder 11a. The exhaust passage 40 guides the exhaust gas exhausted from each combustion chamber 6 to the outside of the automobile.

An air cleaner 31 is disposed on an upstream end portion of the intake passage 30. The air cleaner 31 removes foreign matters in the intake air. A surge tank 33 is provided on a downstream end portion of the intake passage 30.

A compressor 48 of the turbocharger 47, an intake throttle valve 32, and an intercooler 35 are disposed between the air cleaner 31 and the surge tank 33 in the intake passage 30 in the stated order from the upstream side. The intercooler 35 cools the air compressed by the compressor 48. The intake throttle valve 32 adjusts the air volume. The intake throttle valve 32 is basically fully open.

An air flow sensor SN3, an intake air temperature sensor SN4, an intake air pressure sensor SN5, and an intake air $O_2$ sensor SN6 are disposed in the intake passage 30.

The air flow sensor SN3 is disposed on the downstream of the air cleaner 31. The air flow sensor SN3 outputs a measurement signal in accordance with the flow rate of the intake air that passes through the place of the air flow sensor SN3.

The intake air temperature sensor SN4 is disposed on the downstream of the intercooler 35. The intake air temperature sensor SN4 outputs a measurement signal in accordance with the temperature of the intake air passing through the place of the intake air temperature sensor SN4.

The intake air pressure sensor SN5 and the intake air $O_2$ sensor SN6 are disposed near the surge tank 33. The intake air pressure sensor SN5 outputs a measurement signal in accordance with the pressure of the intake air in the place of the intake air pressure sensor SN5. The intake air $O_2$ sensor SN6 outputs a measurement signal in accordance with the oxygen concentration of the intake air in the place of the intake air $O_2$ sensor SN6.

Figure 2:
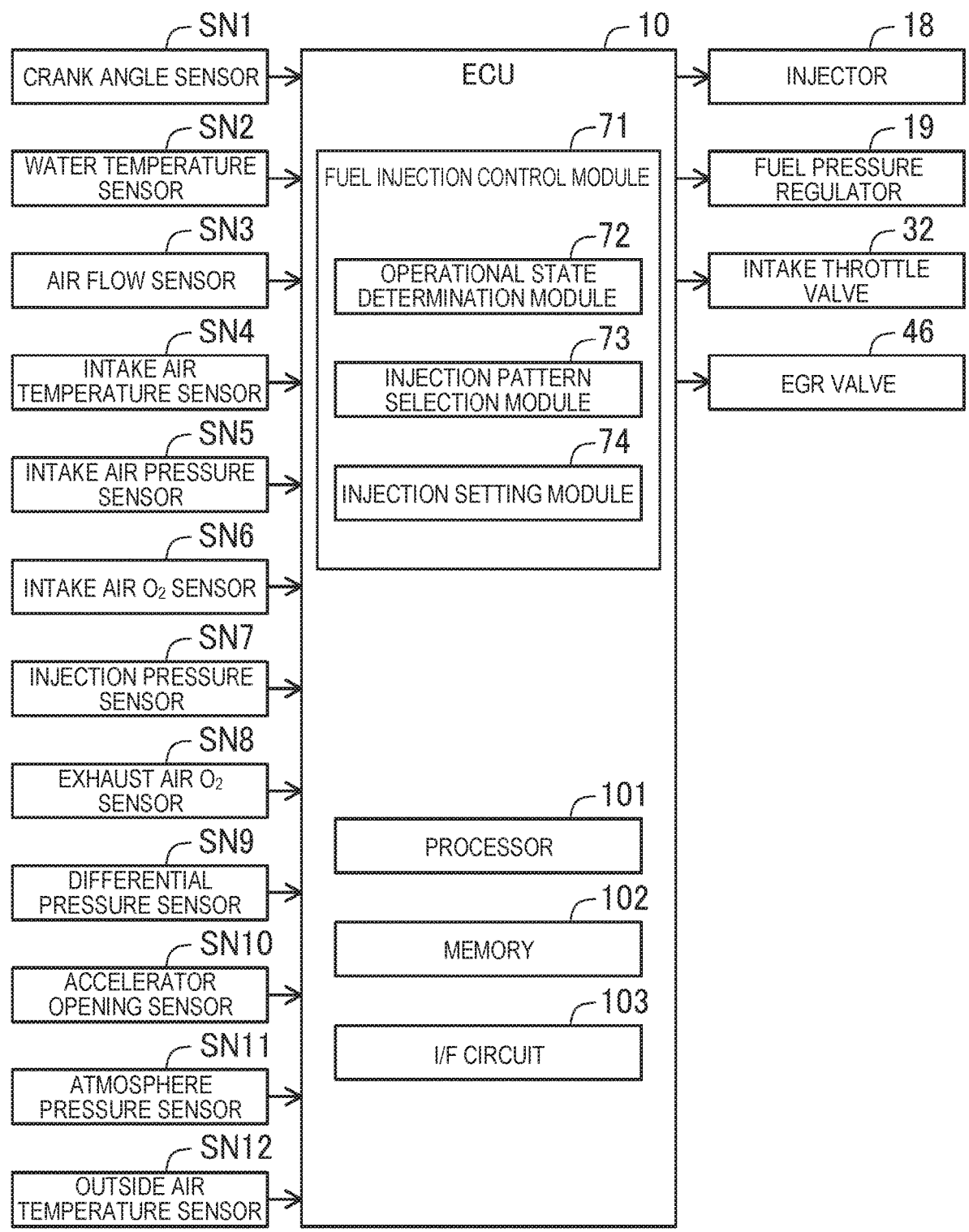
FIG. 2 is a block diagram illustrating a control configuration example of the diesel engine system.

Note that although not shown in FIG. 1, the engine system includes an injection pressure sensor SN7 that outputs a measurement signal in accordance with the injection pressure of the injector 18 (see FIG. 2).

In the exhaust passage 40, a turbine 49 of the turbocharger 47 and the exhaust gas purification apparatus 41 are disposed from the stated order from the upstream side.

The compressor 48 and the turbine 49 of the turbocharger 47 are connected to each other. The compressor 48 and the turbine 49 integrally rotate. The turbine 49 rotates by the fluid energy of the exhaust gas. When the turbine 49 rotates, the compressor 48 rotates. The compressor 48 compresses the intake air.

The exhaust gas purification apparatus 41 purifies harmful components in the exhaust gas. The exhaust gas purification apparatus 41 includes an oxidation catalyst 42 and a diesel particulate filter (hereinafter referred to as a DPF) 43. The oxidation catalyst 42 facilitates the reaction in which $CO_2$ and $H_2O$ are generated by the oxidation of CO and HC in the exhaust gas. The DPF 43 captures fine particles such as soot in the exhaust gas.

In the exhaust passage 40, an exhaust gas $O_2$ sensor SN8 and a differential pressure sensor SN9 are disposed. The exhaust gas $O_2$ sensor SN8 is disposed between the turbine 49 and the exhaust gas purification apparatus 41. The exhaust gas $O_2$ sensor SN8 outputs a measurement signal corresponding to the oxygen concentration of the exhaust gas passing through the place of the exhaust gas $O_2$ sensor SN8. The differential pressure sensor SN9 outputs a measurement signal corresponding to the differential pressure between the upstream end and the downstream end of the DPF 43.

The EGR apparatus 44 returns a portion (that is, EGR gas) of the exhaust gas to the intake passage 30. The EGR apparatus 44 includes an EGR passage 45 and an EGR valve 46. The EGR passage 45 connects the intake passage 30 and the exhaust passage 40 to each other. In more detail, the EGR passage 45 connects a portion that is upstream of the turbine 49 in the exhaust passage 40, and a portion between the intercooler 35 and the surge tank 33 in the intake passage 30. The EGR valve 46 is provided in the middle of the EGR passage 45. The EGR valve 46 adjusts the return flow rate of the EGR gas. Note that although not shown, an EGR cooler that cools the EGR gas by engine cooling water is disposed in the EGR passage 45.

Configuration of Control Apparatus of Engine

FIG. 2 is a block diagram that exemplifies the control configuration of the engine system. The engine system includes an engine controller (hereinafter referred to as an ECU) 10 that controls the engine 1. The ECU 10 is one example of a controller. The ECU 10 is a microcomputer that includes a processor 101, memory 102, and an I/F circuit 103. The processor 101 (e.g., a central processing unit (CPU)) executes software programs. The memory 102 includes random access memory (RAM) and read only memory (ROM), for example. The memory 102 stores therein the software programs and data. The I/F circuit inputs and outputs electrical signals.

The ECU 10 receives the measurement signal of each of a plurality of sensors installed in the automobile. In the automobile, an accelerator opening sensor SN10, an atmosphere pressure sensor SN11, and an outside air temperature sensor SN12 are installed besides the crank angle sensor SN1, the water temperature sensor SN2, the air flow sensor SN3, the intake air temperature sensor SN4, the intake air pressure sensor SN5, the intake air $O_2$ sensor SN6, the injection pressure sensor SN7, the exhaust gas $O_2$ sensor SN8, and the differential pressure sensor SN9 described above. The accelerator opening sensor SN10 outputs a measurement signal in accordance with the amount by which an accelerator pedal is stepped. The atmosphere pressure sensor SN11 outputs a measurement signal in accordance with the atmosphere pressure under an environment in which the automobile is travelling. The outside air temperature sensor SN12 outputs a measurement signal in accordance with the air temperature under the environment in which the automobile is travelling.

The ECU 10 determines the operational state of the engine 1 on the basis of the measurement signals of the sensors SN1 to SN12, and outputs control signals to the injector 18, the fuel pressure regulator 19, the intake throttle valve 32, and the EGR valve 46. As a result, the engine 1 operates.

With regard to the control of the injector 18, the ECU 10 includes a fuel injection control module 71. The ECU 10 executes the fuel injection control module 71 and other modules such as an operational state determination module 72, an injection pattern selection module 73, and an injection setting module 74 to perform their respective functions. These modules are stored in the memory 102 as software.

The operational state determination module 72 determines the operational state of the engine 1 from the engine speed based on the measurement signal of the crank angle sensor SN1, and the engine load based on the measurement signal of the accelerator opening sensor SN10. The operational state determination module 72 determines whether the operational state of the engine 1 is within a rapid multi-stage combustion region or within a normal combustion region, and determines the region out of regions A to E in the rapid multi-stage combustion region that the operational state of the engine 1 is in (see FIG. 7).

The injection pattern selection module 73 selects the injection pattern corresponding to the operational state determined by the operational state determination module 72. Details are described below. When the operational state of the engine 1 is within the rapid multi-stage combustion region, the injection pattern includes at least one pilot injection, a main injection, and at least one after injection (see FIG. 9).

The injection setting module 74 sets the total injection amount to be injected into the combustion chamber 6 during one combustion cycle and the injection pressure thereof on the basis of the operational state of the engine, and sets the injection amount and the injection timing of each injection in accordance with the injection pattern selected by the injection pattern selection module 73. When the ECU 10 outputs a control signal to the injector 18 in accordance with the setting of the injection setting module 74, the injector 18 injects the fuel into the combustion chamber 6 by the set amount at a set injection pressure at a set timing.

Structure of Piston

Figure 4:
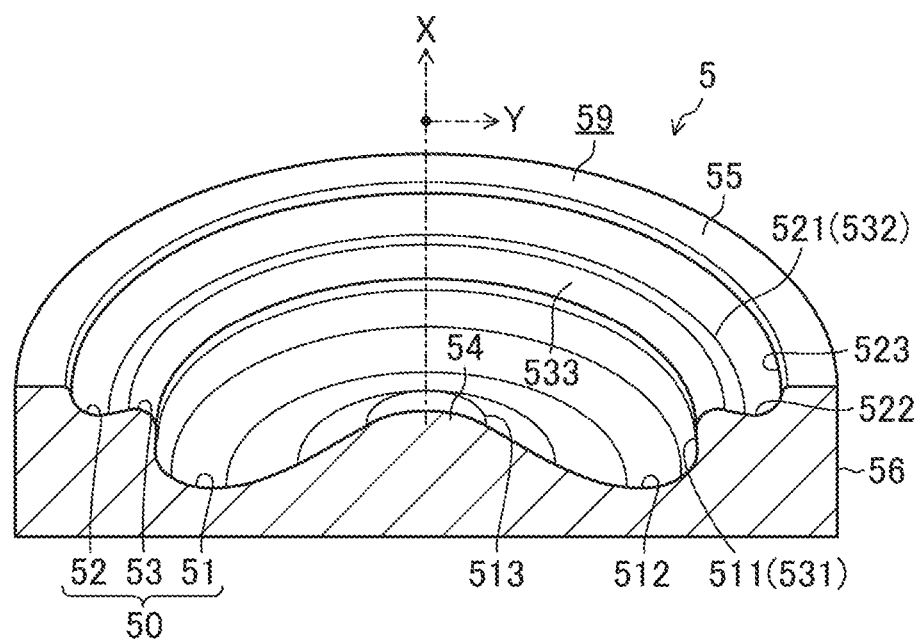
FIG. 4 is a perspective view of the piston with a cross section thereof.
Figure 5:
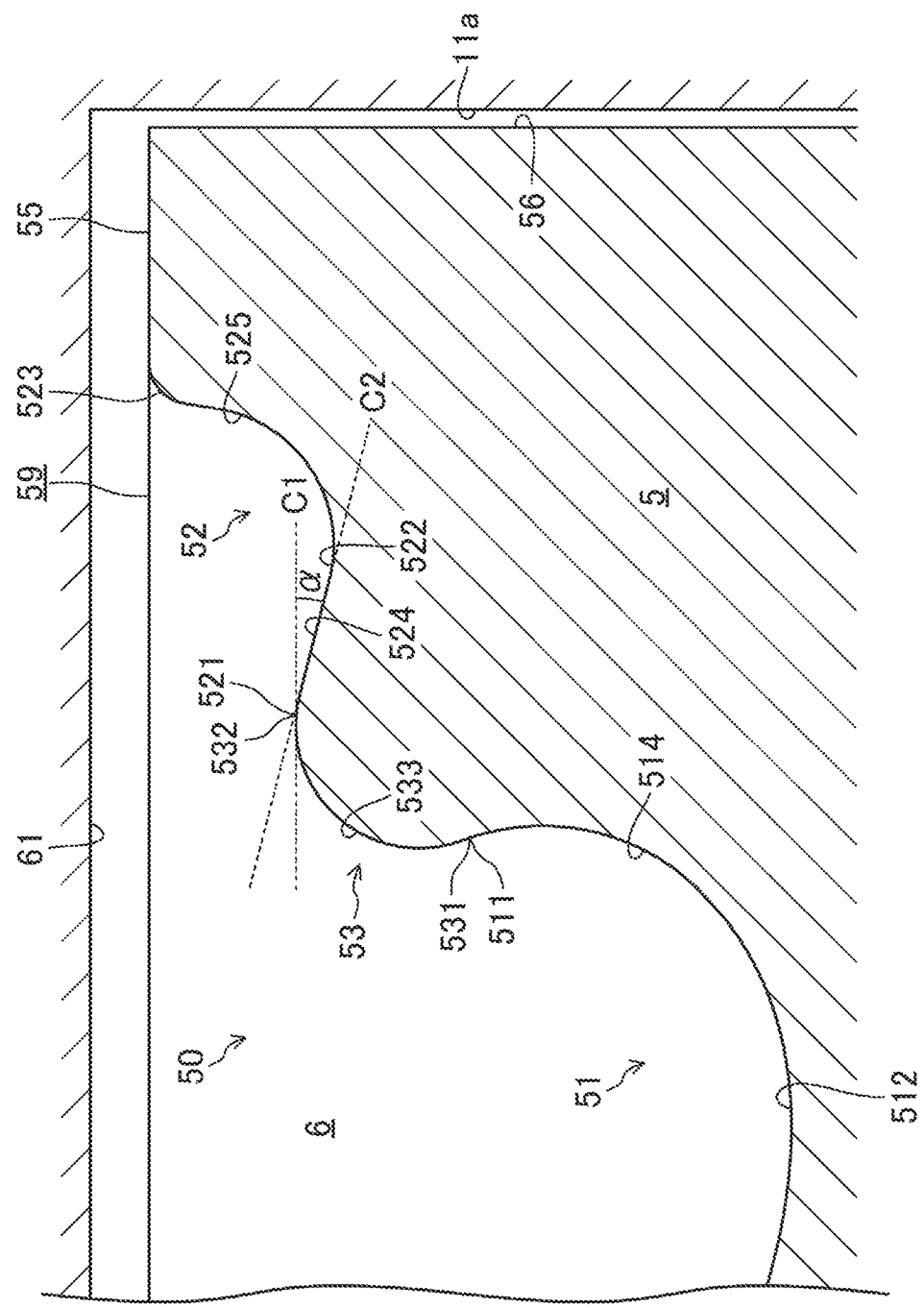
FIG. 5 is an enlarged view of the piston cross section illustrated in FIG. 4.

Next, the structure of the piston 5 is described with reference to FIG. 3 to FIG. 5. FIG. 3 is a perspective view mainly illustrating the upper portion of the piston 5. FIG. 4 is a perspective view of the piston 5 with a cross section thereof. FIG. 5 is an enlarged view of the cross section illustrated in FIG. 4. Note that in FIG. 3 and FIG. 4, an axial direction X of the cylinder 11a and a radial direction Y of cylinder 11a are indicated by arrows.

The piston 5 includes the cavity 50, a peripheral edge planar portion 55, and a side peripheral surface 56. A part of the wall surface forming the combustion chamber 6 is the top surface 59 of the piston 5. The cavity 50 is provided in the top surface 59 of the piston 5. The cavity 50 is a portion in which the top surface 59 is recessed downward in the axial direction X. The cavity 50 receives the fuel spray injected by the injector 18. The peripheral edge planar portion 55 is a ring-shaped planar portion disposed in a region near the outer peripheral edge of the top surface 59 in the radial direction Y. The cavity 50 is provided in the central region of the top surface in the radial direction Y besides the peripheral edge planar portion 55. The side peripheral surface 56 is a surface that is in sliding contact with the inner wall surface of the cylinder 11a.

The cavity 50 includes a lower cavity portion 51, an upper cavity portion 52, a lip portion 53, and a hill portion 54. The combustion chamber 6 has a so-called two-stage cavity. As described in detail below, each of the lower cavity portion 51 and the upper cavity portion 52 has a wall surface with an egg-like cross section. The shape of the cavity 50 can be referred to as a two-stage egg-shaped shape.

The lower cavity portion 51 is a recessed portion disposed in a central region of the top surface 59 in the radial direction Y. The upper cavity portion 52 is a ring-shaped recessed portion disposed around the lower cavity portion 51 in the top surface 59. The lip portion 53 is a portion that connects the lower cavity portion 51 and the upper cavity portion 52 to each other. The hill portion 54 is a protruding portion disposed in the central position of the piston 5 in the radial direction. The hill portion 54 is located directly below the injector 18.

The capacity of the lower cavity portion 51 is larger than the capacity of the upper cavity portion 52. The capacity ratio between the lower cavity portion 51 and the upper cavity portion 52 is set to a predetermined capacity ratio. In this configuration example, the capacity ratio between the lower cavity portion 51 and the upper cavity portion 52 is 70:30.

The lower cavity portion 51 includes a first upper end portion 511, a first bottom portion 512, a first inner-side end portion 513, and a radially recessed portion 514.

The first upper end portion 511 is in the highest position in the lower cavity portion 51, and continues to the lip portion 53. The first bottom portion 512 is the most recessed region in the lower cavity portion 51. The first bottom portion 512 is the deepest portion in the entire cavity 50, and the lower cavity portion 51 has a predetermined depth (first depth) in the axial direction X at the first bottom portion 512. The first bottom portion 512 has a ring-like shaped in top view. The first bottom portion 512 is in a position close to the lip portion 53 on the inner side thereof in the radial direction Y.

The radially recessed portion 514 connects the first upper end portion 511 and the first bottom portion 512 to each other. The radially recessed portion 514 is curved to the outer side in the radial direction Y. The radially recessed portion 514 has a portion recessed to the outer side than the lip portion 53 in the radial direction Y. The first inner-side end portion 513 is in the innermost position in the lower cavity portion 51 in the radial direction, and continues to the lower end of the hill portion 54. The first inner-side end portion 513 and the first bottom portion 512 are connected to each other by a curved surface that is gently curved.

The upper cavity portion 52 includes a second inner-side end portion 521, a second bottom portion 522, a second upper end portion 523, a tapered region 524, and a wall rising region 525.

The second inner-side end portion 521 is in the innermost position in the upper cavity portion 52 in the radial direction, and continues to the lip portion 53. The second bottom portion 522 is the most recessed region in the upper cavity portion 52. The second bottom portion 522 is located above the first bottom portion 512 in the axial direction X. The upper cavity portion 52 is shallower than the lower cavity portion 51. The second upper end portion 523 is located in the highest position and the outermost side in the radial direction in the upper cavity portion 52. The second upper end portion 523 continues to the peripheral edge planar portion 55.

The tapered region 524 is a portion extending from the second inner-side end portion 521 toward the second bottom portion 522, and having a surface shape inclined downward to the outer side in the radial direction. As illustrated in FIG. 5, the tapered region 524 has an inclination along an inclined line C2 that intersects with a horizontal line C1 extending in the radial direction Y at an inclination angle α.

The wall rising region 525 is a wall surface formed so as to relatively steeply rise at the radial outer side than the second bottom portion 522. In the cross sectional shape in the radial direction Y, the wall surface of the upper cavity portion 52 is a curved surface that is curved so as to head from the horizontal direction toward the upper direction from the second bottom portion 522 to the second upper end portion 523. The wall rising region 525 is a portion that is a wall surface close to a vertical wall near the second upper end portion 523. The lower portion of the wall rising region 525 is located on the inner side in the radial direction Y with respect to the upper end position of the wall rising region 525. As a result, combustion that effectively uses a space (that is, a squish region) on the outer side than the wall rising region 525 in the radial direction can be performed while preventing the air-fuel mixture from excessively returning to the inner side of the combustion chamber 6 in the radial direction Y. Details are described below.

The lip portion 53 has a shape that protrudes to the inner side in the radial direction in a hump-like manner between the lower cavity portion 51 and the upper cavity portion 52 in the cross-sectional shape in the radial direction Y. The lip portion 53 includes a lower end portion 531, a third upper end portion 532, and a central portion 533 located in the center between the lower end portion 531 and the third upper end portion 532. The lower end portion 531 is connected to the first upper end portion 511 of the lower cavity portion 51. The third upper end portion 532 is connected to the second inner-side end portion 521 of the upper cavity portion 52.

In the axial direction X, the lower end portion 531 is a portion located in the lowermost place of the lip portion 53, and the third upper end portion 532 is a portion located in the uppermost place of the lip portion 53. The tapered region 524 is a region extending from the third upper end portion 532 toward the second bottom portion 522. The second bottom portion 522 is located below the third upper end portion 532. In other words, the upper cavity portion 52 has a second bottom portion 522 recessed downward than the third upper end portion 532. The upper cavity portion 52 does not have a bottom surface horizontally extending to the outer side from the third upper end portion 532 in the radial direction Y. In other words, the third upper end portion 532 and the peripheral edge planar portion 55 are not connected to each other by a horizontal surface.

The hill portion 54 protrudes upward, and the protruding height thereof is the same or substantially the same as the height of the third upper end portion 532 of the lip portion 53. The hill portion 54 is in a position that is recessed than the peripheral edge planar portion 55. The hill portion 54 is located in the center of the lower cavity portion 51. The lower cavity portion 51 has a ring-like shape formed around the hill portion 54.

Flow of Fuel Spray

Figure 6:
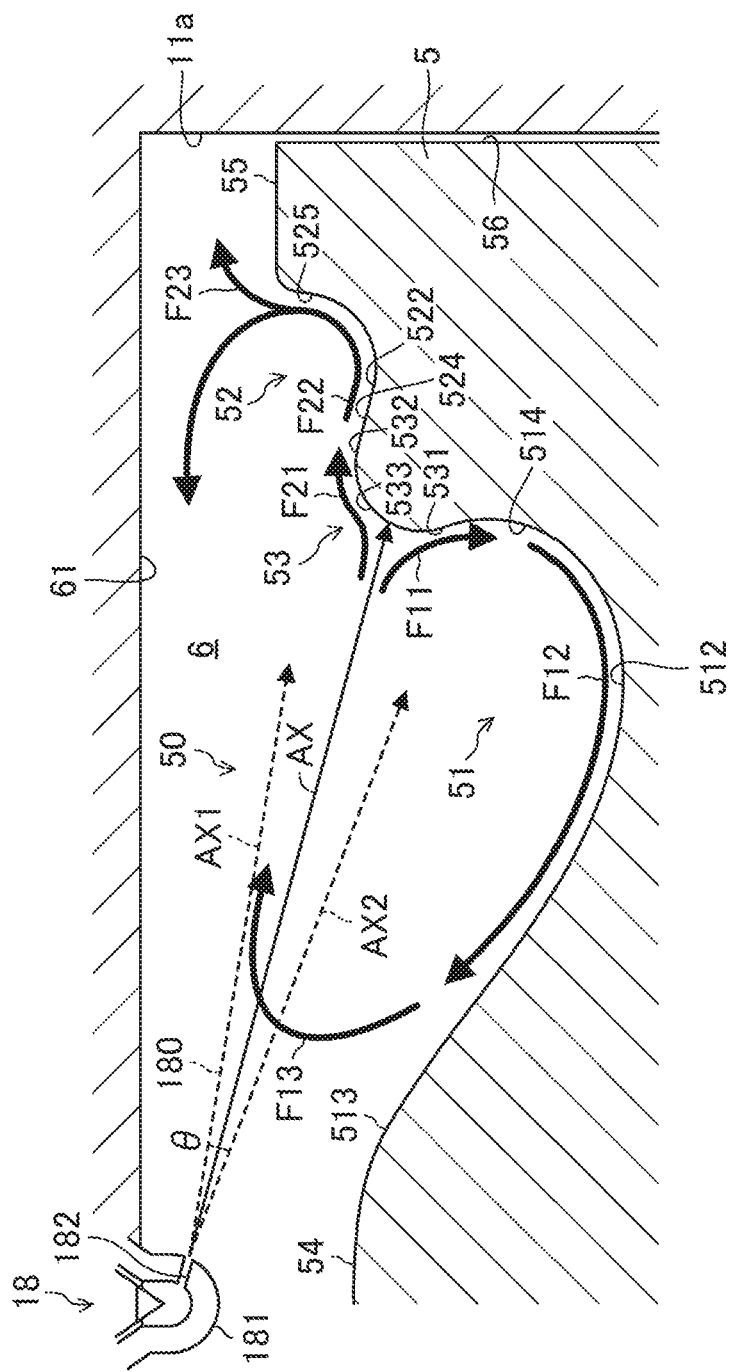
FIG. 6 is a cross sectional view of the piston for describing the flow of the fuel spray injected by an injector.

Next, the flow of the fuel spray injected by the injector 18 is described with reference to FIG. 6. FIG. 6 is a simplified cross-sectional view of the combustion chamber 6. In FIG. 6, the cavity 50 in the piston 5, the injector 18, an injection axis AX of a fuel spray 180 injected by the injector 18, and arrows F11, F12, F13, F21, F22, and F23 indicating the flow of the fuel spray are illustrated.

The injector 18 includes a nozzle 181 protruding downward from a top surface 61 of the combustion chamber 6 into the combustion chamber 6. The nozzle 181 is located in the center of the cylinder 11a in the radial direction. The nozzle 181 has an injection hole 182. The injector 18 injects the fuel spray 180 to the combustion chamber 6 through the injection hole 182. Note that in FIG. 6, one injection hole 182 is illustrated, but the nozzle 181 actually has a plurality of the injection holes 182. The plurality of injection holes 182 are disposed so as to be equally spaced from each other in the circumferential direction of the nozzle 181. The fuel spray 180 flows along the injection axis AX. The injection axis AX matches or substantially matches with the hole axis of each of the injection holes 182. The injected fuel spray 180 is conically diffused at a spray angle θ. FIG. 6 illustrates an upper diffusion axis AX1 indicating the diffusion to the upper direction with respect to the injection axis AX, and a lower diffusion axis AX2 indicating the diffusion to the lower direction. The spray angle θ is an angle formed by the upper diffusion axis AX1 and the lower diffusion axis AX2.

The injection hole 182 can inject the fuel toward the lip portion 53 of the cavity 50. In other words, at a timing in which the piston 5 is in a predetermined position, the injection axis AX can be directed toward the lip portion 53 by injecting the fuel spray through the injection hole 182 by the injector 18. FIG. 6 indicates a positional relationship between the injection axis AX and the cavity 50 at the timing described above. The fuel spray 180 injected from the injection hole 182 hits the lip portion 53.

The fuel spray 180 that has hit the lip portion 53 is then separated into a fuel spray heading toward the lower cavity portion 51 and fuel spray heading toward the upper cavity portion 52.

The fuel spray heading toward the lower cavity portion 51 flows along the surface of the lower cavity portion 51 while mixing with the air existing in the lower cavity portion 51.

In detail, the fuel spray heading in the direction of the arrow F11 enters the radially recessed portion 514 of the lower cavity portion 51 from the lower end portion 531 of the lip portion 53, and flows downward. Then, the fuel spray changes the flow direction from the lower direction to the inner-side direction in the radial direction Y along the curve of the radially recessed portion 514, and flows along the bottom surface of the lower cavity portion 51 including the first bottom portion 512 as indicated by the arrow F12. The bottom surface of the lower cavity portion 51 has a shape that rises toward the center in the radial direction due to the existence of the hill portion 54. The fuel spray flowing in the direction of the arrow F12 is raised to the upper side, and then flows toward the outer side in the radial direction as indicated by the arrow F13.

Meanwhile, the fuel spray heading toward the upper cavity portion 52 flows along the surface of the upper cavity portion 52 while mixing with the air existing in the upper cavity portion 52. In detail, the fuel spray heading toward the direction of the arrow F21 enters the tapered region 524 of the upper cavity portion 52 from the third upper end portion 532 of the lip portion 53, and heads to a diagonally downward direction along the inclination of the tapered region 524. Then, as indicated by the arrow F22, the fuel spray reaches the second bottom portion 522. Now, the tapered region 524 is a surface having an inclination along the injection axis AX. Therefore, the fuel spray can smoothly flow to the outer side in the radial direction. In other words, the fuel spray can reach a position deep in the combustion chamber 6 on the outer side thereof in the radial direction by the existence of the tapered region 524 and the existence of the second bottom portion 522 located below the third upper end portion 532 of the lip portion 53.

Then, the fuel spray is raised to the upper side by a rising curved surface from the second bottom portion 522 to the wall rising region 525, and flows toward the inner side in the radial direction along the top surface 61 of the combustion chamber 6. The fuel can be combusted by also using the air between the top surface 59 of the piston 5 and the top surface 61 of the combustion chamber 6. Now, the wall rising region 525 has a shape in which the lower portion is located on the inner side in the radial direction Y with respect to the upper end position. Therefore, the flow indicated by the arrow F22 does not become excessively strong, and the fuel spray does not return to the inner side in the radial direction Y too much.

The wall rising region 525 illustrated in FIG. 6 also generates a flow heading toward the outer side in the radial direction Y indicated by the arrow F23. In the expansion stroke, a flow in the arrow F23 is especially easily generated by the traction by a reverse squish flow. Therefore, in the latter period of the combustion, combustion also utilizing the air in the squish space on the outer side than the wall rising region 525 in the radial direction is realized.

The combustion in the combustion chamber 6 having a two-stage cavity suppresses the generation of soot and is advantageous in improving fuel efficiency of the engine 1 because the air utilization rate is improved.

Control of Engine

Figure 7:
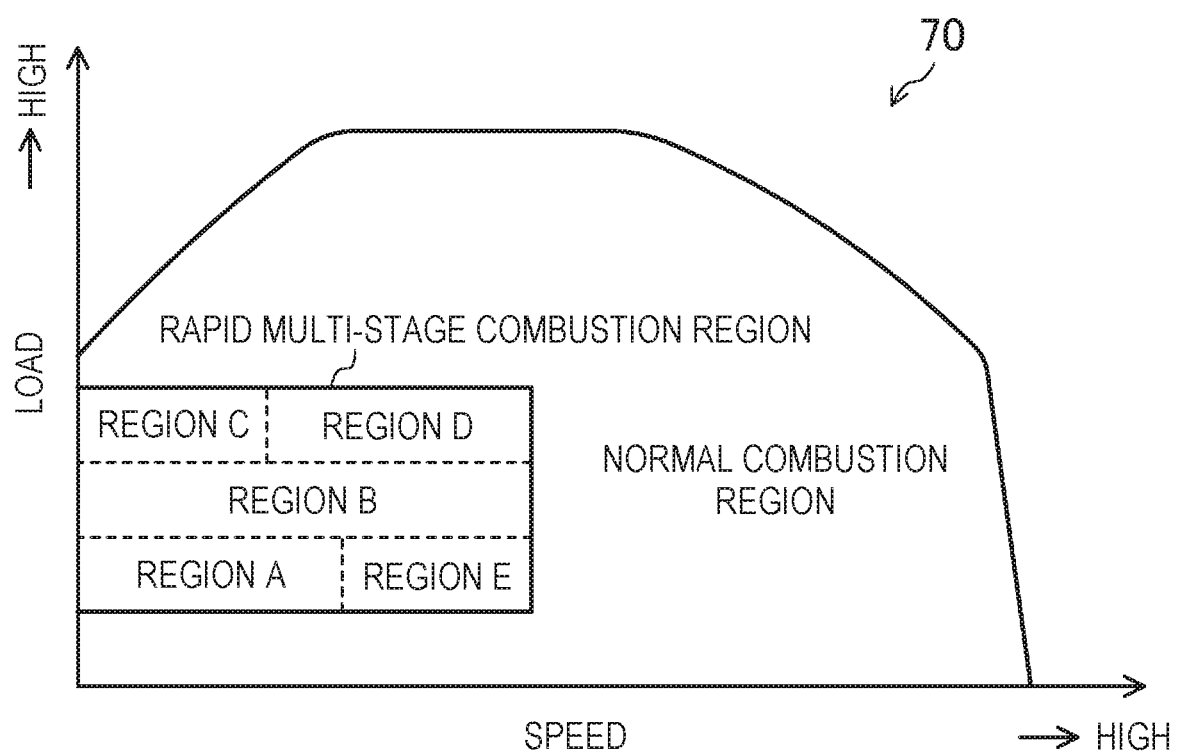
FIG. 7 exemplifies a part of an operation map of the diesel engine.

FIG. 7 exemplifies an operation map 70 of the engine 1. The operation map 70 is stored in the memory 102 of the ECU 10. The ECU 10 controls the engine 1 in accordance with the operation map 70.

The operation map 70 of the engine 1 is defined by the engine speed and the engine load. The operation map 70 is divided into a normal combustion region and a rapid multi-stage combustion region. The rapid multi-stage combustion region is a low-speed region and a low-to-middle-load region with respect to the entire operation region of the engine 1. Note that the "low-speed region" is equivalent to a low-speed region when the operation region of the engine 1 is bisected into the low-speed region and a high-speed region in direction of the speed. The "low-to-middle-load region" is equivalent to a part of a middle-load region and a low-load region when the operation region of the engine 1 is trisected into the low-load region, the middle-load region, and a high-load region in the direction of the load. A part of the low-load region is a region in the low-load region besides a light load region.

Figure 8:
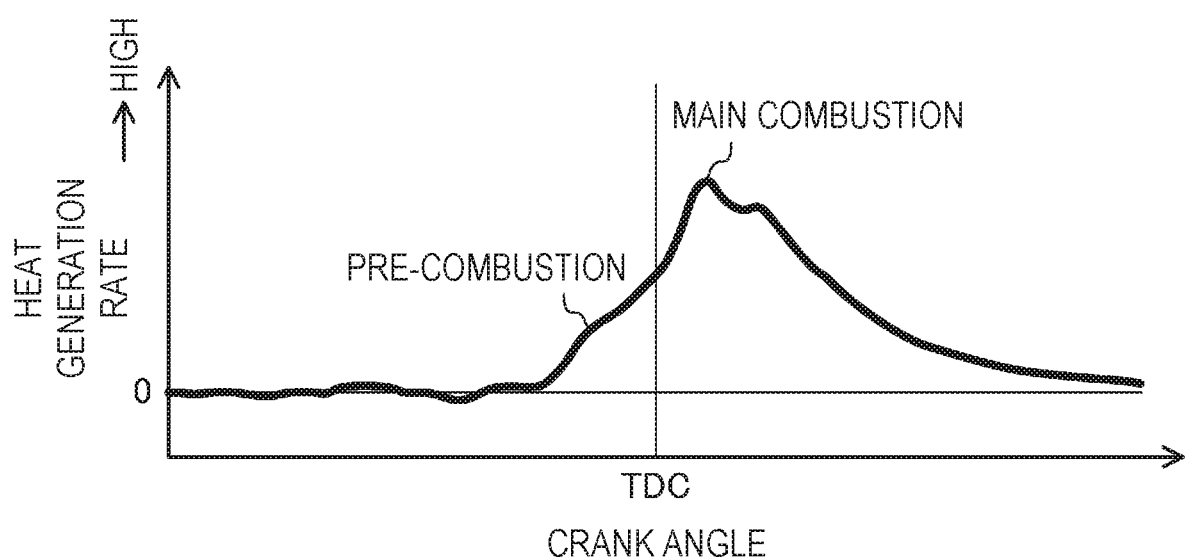
FIG. 8 exemplifies the change of the heat generation rate with respect to the progress of a crank angle.

FIG. 8 exemplifies a waveform of the heat generation rate in the rapid multi-stage combustion region. In FIG. 8, the horizontal axis is the crank angle and the vertical axis is the heat generation rate. The rapid multi-stage combustion is a combustion in which the change of the heat generation rate forms a hill due to the heat generation of the pre-combustion and the heat generation of the main combustion being in a smooth succession. Note that the main combustion is a combustion that generates the torque of the engine 1. The pre-combustion is a combustion prior to the main combustion, and is a combustion that increases the ignitability of the fuel. In the rapid multi-stage combustion, the rise of the heat generation rate is relatively rapid, and hence the combustion period is also short. The rapid multi-stage combustion can improve thermal efficiency and improve emission performance while suppressing the increase in combustion noise. By performing the rapid multi-stage combustion by the engine 1, the automobile in which the engine 1 is installed can realize a high degree of quietness, lower fuel consumption, and cleaner exhaust gas.

As illustrated in FIG. 7, the rapid multi-stage combustion region is divided into five regions, that is, a region A to a region E. The region B is equivalent to a second load region when the rapid multi-stage combustion region is trisected into a first load region, the second load region, and a third load region in the direction from the low load to the high load. The region B is a load region in the center in the rapid multi-stage combustion region and is a region serving as a base region.

The region A is a region in which the load is lower than that in the region B. The region A is equivalent to the low-speed region in the regions in which the load is lower than that in the region B. The region E is a region in which the load is lower than that in the region B as with the region A. The region E is equivalent to a high-speed region in the regions in which the load is lower than that in the region B. In other words, the region E is a region in which the speed is higher than that in the region A.

The region C is a region in which the load is higher than that in the region B. The region C is equivalent to a low-speed region in the regions in which the load is higher than that in the region B. The region D is a region in which the load is higher than that in the region B as with the region C. The region D is equivalent to a high-speed region in the regions in which the load is higher than that in the region B. In other words, the region D is a region in which the speed is higher than that in the region C.

Note that the region B extends in the entire direction of the speed in the rapid multi-stage combustion region.

Figure 9:
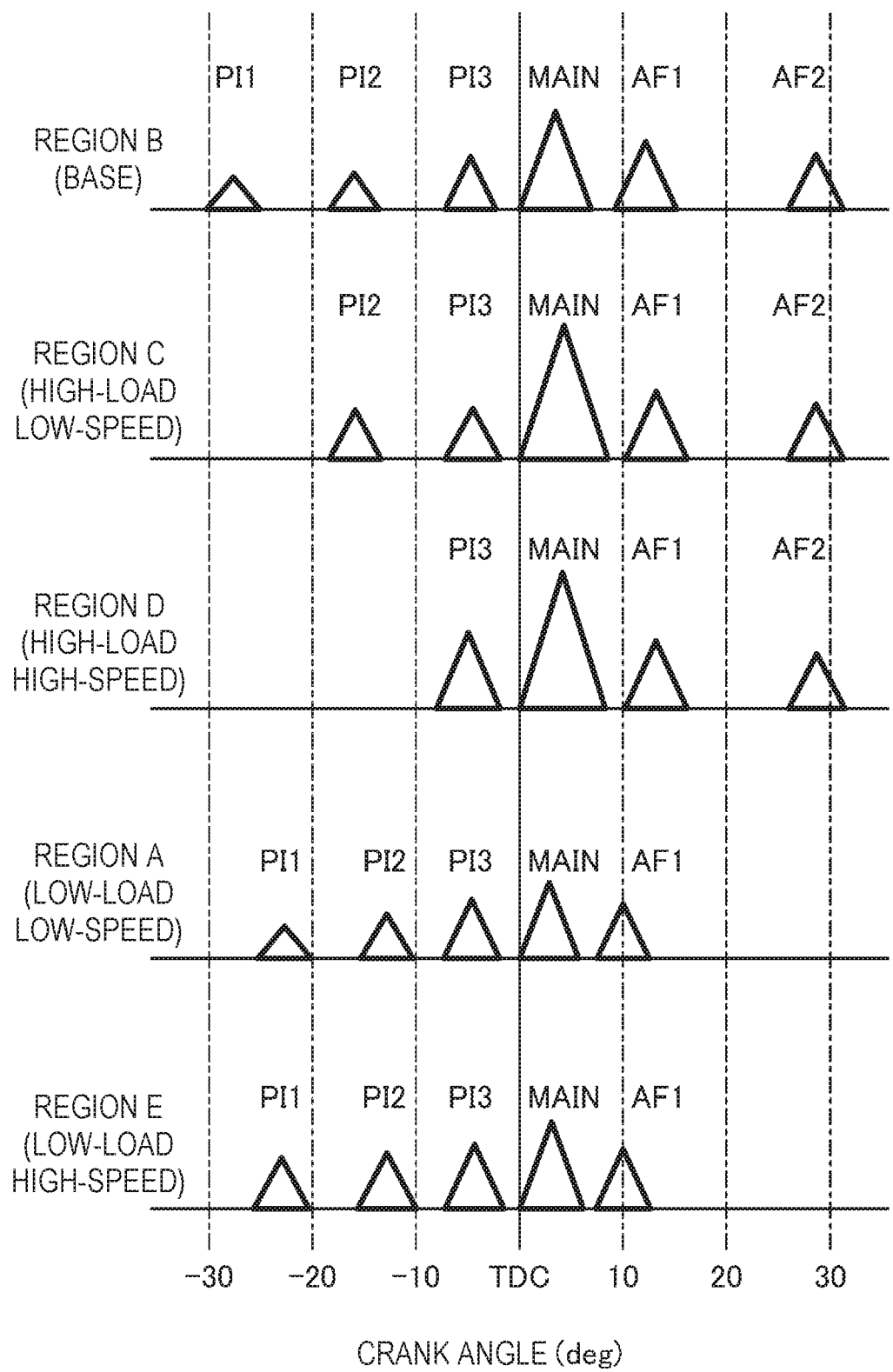
FIG. 9 exemplifies a fuel injection pattern for each region.

FIG. 9 exemplifies a fuel injection pattern in the rapid multi-stage combustion region. In FIG. 9, the horizontal axis indicates the crank angle and the vertical axis indicates the lift amount of the injector 18. Each triangular area in FIG. 9 is equivalent to the injection amount in each injection. In other words, the injection amount increases as the triangular area increases. The "high load" and the "low load" indicated in FIG. 9 mean that the load is a relatively high load or a relatively low load with respect to the region B that is the base region. The "low-speed" and the "high-speed" mean that the speed is a relatively low speed or a relatively high speed when the region C and the region D are compared with each other, and that the speed is a relatively low speed or a relatively high speed when the region A and the region E are compared with each other.

In the rapid multi-stage combustion region, the engine 1 performs at least one pilot injection during the compression stroke, a main injection at a predetermined timing after the compression stroke, and at least one after injection during the expansion stroke. It will be appreciated that the timing of the pilot injection may include a start timing and/or an end timing.

According to research by the inventors of the present application, when rapid multi-stage combustion is performed in the combustion chamber 6 having a two-stage cavity, the rapid multi-stage combustion can be realized while increasing the air utilization rate by distributing the fuel to each of the lower cavity portion 51 and the upper cavity portion 52 by an amount corresponding to the capacity ratio. As described above, the fuel spray hits the lip portion 53 and is distributed to the lower cavity portion 51 and the upper cavity portion 52.

Now, in the rapid combustion region, the waveforms of the heat generation rate are desired to be the same across the entire region. As a result, thermal efficiency and emission performance can be improved while suppressing the increase in combustion noise across a wide range in the operation region of the engine 1.

However, when the load of the engine 1 changes, the total fuel amount to be injected to the combustion chamber 6 and the injection pressure thereof change. Specifically, when the load of the engine 1 increases, the total injection amount increases and the injection pressure increases. When the injection amount increases and/or the injection pressure increases, the penetration of the fuel spray injected by the injector 18 increases. When the penetration of the fuel spray changes, the time required for the fuel spray to reach the lip portion 53 changes. Even when the injector 18 injects the fuel at the same timing, the place at which the fuel spray hits the lip portion 53 changes when the penetration of the fuel spray changes. As a result, the distribution ratio of the fuel between the lower cavity portion 51 and the upper cavity portion 52 changes.

When the speed of the engine 1 increases, the boost pressure of the turbocharger 47 increases, and hence the pressure in the combustion chamber 6 increases. When the pressure in the combustion chamber 6 increases, the fuel spray scatters less easily. When the pressure in the combustion chamber 6 changes, the time required for the fuel spray to reach the lip portion 53 changes, and hence the distribution ratio of the fuel between the lower cavity portion 51 and the upper cavity portion 52 changes as with the above.

Thus, the ECU 10 sets patterns for the fuel injection in the regions A to E in the rapid combustion region so that the distribution ratio between the fuel for the upper cavity portion 52 and the fuel for the lower cavity portion 51 does not change even when the load and/or the speed of the engine 1 changes. The fuel injection in the region B that is the base region in the rapid combustion region is described below. Then, the fuel injections in the regions C, D, A, and E are sequentially described while being compared with the fuel injection in the region B.

Fuel Injection of Region B

Figure 10:
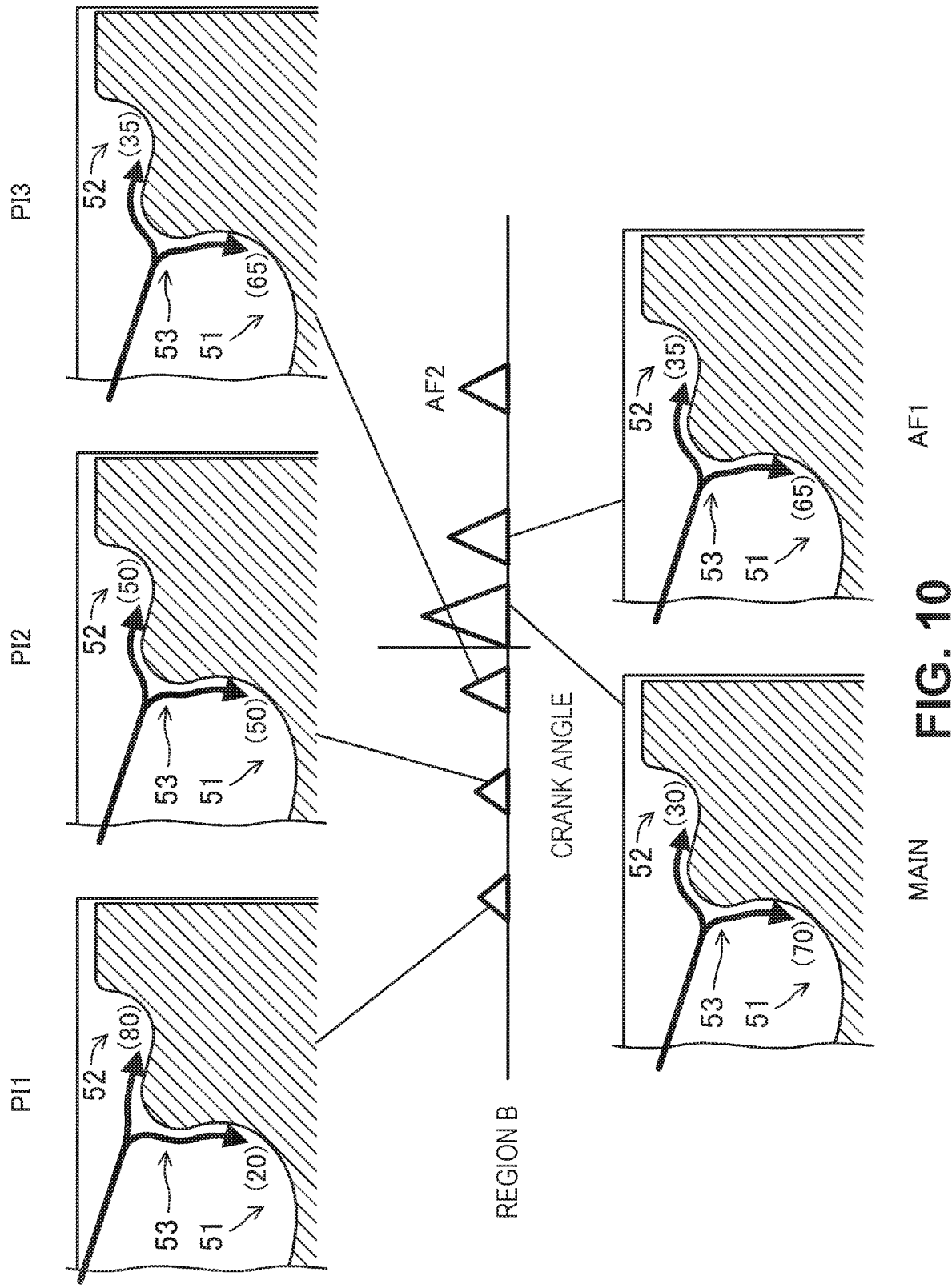
FIG. 10 exemplifies a fuel injection pattern in a region B, and the distribution ratio of the fuel between the upper cavity and the lower cavity in each injection.

FIG. 10 illustrates the pattern of the fuel injection in the region B and the distribution ratio of the fuel spray between the lower cavity portion 51 and the upper cavity portion 52 for each injection. The numbers in parentheses in FIG. 10 indicate the distribution ratios of the fuel. The vertical solid line in the fuel injection pattern in FIG. 10 indicates the compression top dead center. The same applies to FIG. 11 to FIG. 14 described below.

In the region B, the engine 1 performs six injections, that is, a first pilot injection PI1, a second pilot injection PI2, a third pilot injection PI3, a main injection MAIN, a first after injection AF1, and a second after injection AF2. The region B is a region in which the load is relatively low with respect to the entire operation map of the engine 1. The total injection amount in the region B is not large, and hence the temperature in the combustion chamber 6 is low. The region B is a region in which the ignitability of the fuel is low. Thus, in the region B, the ECU 10 increases the number of pilot injections, to thereby advance the timing of the first pilot injection. When the timing of the pilot injection is early, the reaction time of the fuel becomes longer, and hence the ignitability of the fuel improves. When the ignitability of the fuel improves, the rapid multi-stage combustion is stabilized. The stabilization of the rapid multi-stage combustion is advantageous in terms of cleaning the exhaust gas and improving the NVH (noise, vibration, harshness) performance of the automobile.

Now, when the injection amounts of the first pilot injection PI1, the second pilot injection PI2, and the third pilot injection PI3 are compared with each other, the injection amount of the first pilot injection PI1 is the smallest, the injection amount of the third pilot injection PI3 is the largest, and the injection amount of the second pilot injection PI2 is therebetween.

The first pilot injection PI1 is executed at an early timing, and hence the pressure in the combustion chamber 6 is low and the temperature is low. The fuel spray easily scatters, and there is a concern that unburned fuel increases when the fuel spray adheres to the wall surface of the combustion chamber 6 while the temperature in the combustion chamber 6 is low. Thus, the ECU 10 reduces the injection amount of the first pilot injection PI1. The penetration of the fuel spray decreases, and hence the adherence of the fuel spray of the first pilot injection PI1 to the wall surface is suppressed.

The third pilot injection PI3 is executed at a late timing, and hence the temperature in the combustion chamber 6 is high. The fuel spray is allowed to adhere to the wall surface of the combustion chamber 6 to some extent. The ECU 10 can increase the injection amount of the third pilot injection PI3.

As described above, by gradually increasing the injection amounts of the first pilot injection PI1, the second pilot injection PI2, and the third pilot injection PI3, advantage is obtained in terms of improving fuel efficiency of the engine 1 and producing cleaner exhaust gas.

As illustrated in FIG. 9, the first pilot injection PI1 is executed from around −30° to around −20° before the compression top dead center (TDC). The timing of the first pilot injection PI1 is early, and hence the piston 5 is separated from the injector 18. The fuel spray of the first pilot injection PI1 hits a place near the upper portion of the lip portion 53. The distribution ratio of the fuel spray for the upper cavity portion 52 increases, and the distribution ratio of the fuel spray for the lower cavity portion 51 decreases. In the configuration example in FIG. 10, the fuel spray of the first pilot injection PI1 is distributed at a ratio of 20 for the lower cavity portion 51 and 80 for the upper cavity portion 52.

The second pilot injection PI2 is executed from around −20° to around −10° before the TDC. The second pilot injection PI2 is later than the first pilot injection PI1, and hence the piston 5 is close to the injector 18. The fuel spray of the second pilot injection PI2 hits a place near the central portion 533 of the lip portion 53. The distribution ratio of the fuel spray for the upper cavity portion 52 and the distribution ratio of the fuel spray for the lower cavity portion 51 are substantially equal to each other. In the configuration example in FIG. 10, the fuel spray of the second pilot injection PI2 is distributed at a ratio of 50 for the lower cavity portion 51 and 50 for the upper cavity portion 52.

The third pilot injection PI3 is executed from around −10° to around 0° before the TDC. The piston 5 is closer to the injector 18. The fuel spray of the third pilot injection PI3 hits a place near the lower portion of the lip portion 53. The distribution ratio of the fuel spray for the lower cavity portion 51 increases, and the distribution ratio of the fuel spray for the upper cavity portion 52 decreases. In the configuration example in FIG. 10, the fuel spray of the third pilot injection PI3 is distributed at a ratio of 65 for the lower cavity portion 51 and 35 for the upper cavity portion 52.

The main injection MAIN is executed at a predetermined timing after the TDC. In the configuration example in FIG. 10, the main injection MAIN is executed from around 0° to around +10° after the TDC. The fuel spray of the main injection MAIN hits a place near the lower portion of the lip portion 53. The distribution ratio of the fuel spray for the lower cavity portion 51 increases, and the distribution ratio of the fuel spray for the upper cavity portion 52 decreases. In the configuration example in FIG. 10, the fuel spray of the main injection MAIN is distributed at a ratio of 70 for the lower cavity portion 51 and 30 for the upper cavity portion 52. In the region B, the fuel spray of the main injection MAIN is distributed in accordance with the capacity ratio between the lower cavity portion 51 and the upper cavity portion 52. In other words, the shape of the cavity 50 in the piston 5 is defined so that the fuel spray of the main injection MAIN in the region B is distributed in accordance with the capacity ratio.

The first after injection AF1 is executed from around +10° to around +15° after the TDC. The fuel spray of the first after injection AF1 hits a place near the lower portion of the lip portion 53. The distribution ratio of the fuel spray for the lower cavity portion 51 increases, and the distribution ratio of the fuel spray for the upper cavity portion 52 decreases. In the configuration example in FIG. 10, the fuel spray of the first after injection AF1 is distributed at a ratio of 65 for the lower cavity portion 51 and 35 for the upper cavity portion 52.

The second after injection AF2 is executed from around +20° to around +30° after the TDC. Although not shown, the fuel spray of the second after injection AF2 enters the air-fuel mixture that is being combusted.

Now, when the injection amount of the main injection MAIN increases, the penetration of the fuel spray increases. When the penetration of the fuel spray increases, the time required for the fuel spray to reach the lip portion 53 becomes shorter, and hence the fuel spray of the main injection MAIN is distributed to the lower cavity portion 51 by a larger amount. The lower cavity portion 51 has a larger capacity than the upper cavity portion 52. Therefore, when the injection amount of the main injection MAIN increases, the fuel can be combusted with use of a large amount of oxygen in the lower cavity portion 51. The combustion chamber 6 having the lower cavity portion 51 with a large capacity is advantageous in terms of improving the air utilization rate.

Fuel Injection of Region C

Figure 11:
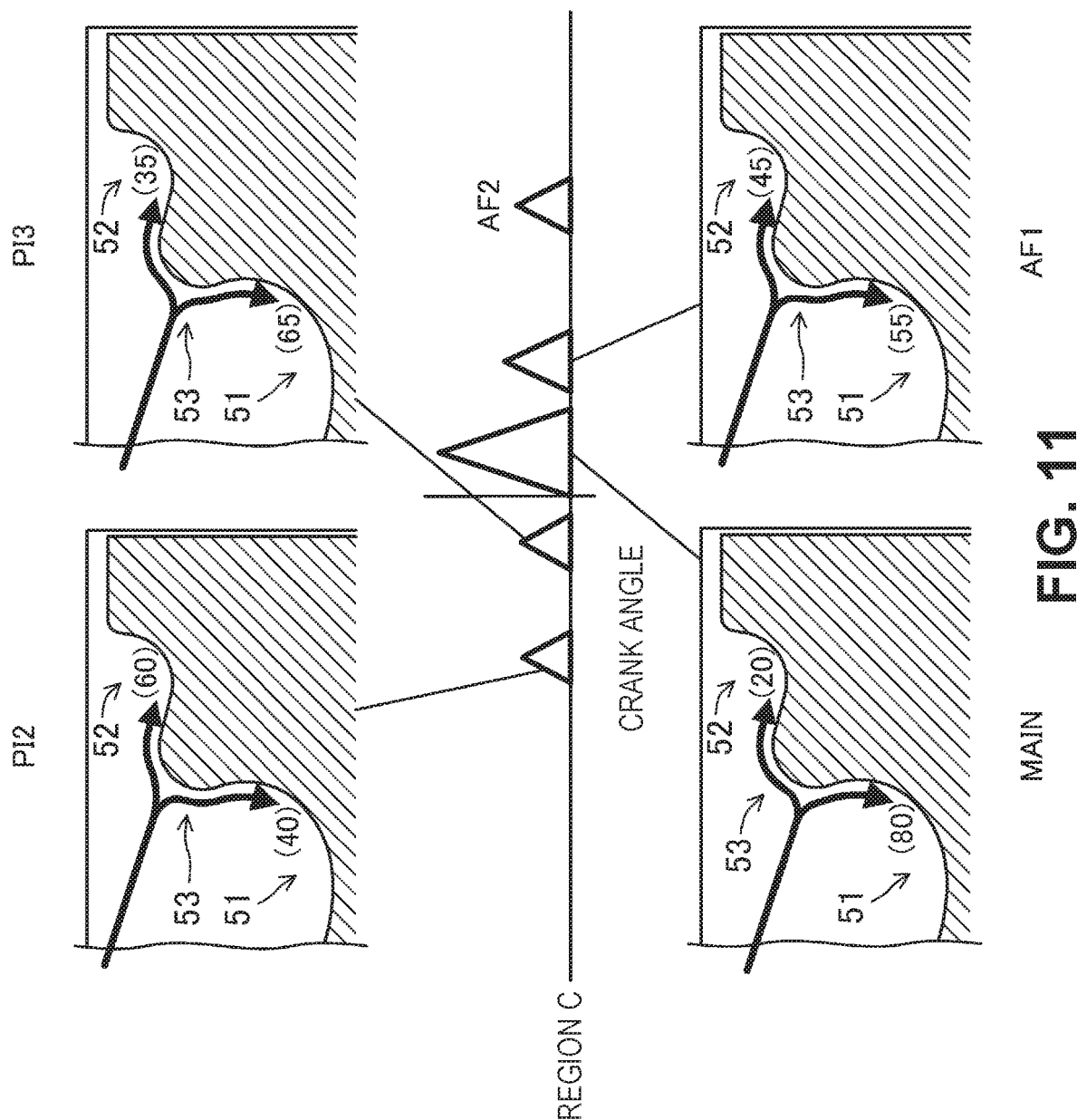
FIG. 11 exemplifies a fuel injection pattern in a region C, and the distribution ratio of the fuel between the upper cavity and the lower cavity in each injection.

FIG. 11 illustrates the pattern of the fuel injection in the region C and the distribution ratio of the fuel spray between the lower cavity portion 51 and the upper cavity portion 52 for each injection.

The region C is a region in which the load of the engine 1 is higher than that in the region B. Because the load of the engine 1 is high, the total injection amount in the region C is larger than the total injection amount in the region B. Because the total injection amount is large, the fuel pressure regulator 19 sets the injection pressure in the region C to be higher than the injection pressure in the region B. In the region C, the penetration of the fuel spray is higher than that in the region B. The region C is a relatively low-speed region. Therefore, the boost pressure is relatively low. The pressure in the combustion chamber 6 is relatively low, and hence the fuel spray easily scatters.

In the region C, the ECU 10 sequentially executes the second pilot injection PI2, the third pilot injection PI3, the main injection MAIN, the first after injection AF1, and the second after injection AF2.

As with the timing of the main injection MAIN in the region B, the timing of the main injection MAIN in the region C is a predetermined timing after the TDC (from around 0° to around +10° after the TDC). In the rapid multi-stage combustion region, the timing of the main injection MAIN is the same or substantially the same even when the load and/or the speed of the engine 1 change. As a result, the timing of the heat generation by the main injection becomes the same, and hence a high thermal efficiency can be maintained even when the load and/or the speed of the engine 1 changes.

While the timing of the main injection MAIN in the region C is the same as the timing of the main injection MAIN in the region B, the injection amount of the main injection MAIN in the region C is larger than the injection amount of the main injection MAIN in the region B. The penetration of the fuel spray of the main injection MAIN is relatively high and the fuel spray easily scatters. The fuel spray rapidly reaches the lip portion 53, and hence the fuel spray hits a place near the lower portion of the lip portion 53. The distribution ratio of the fuel spray of the main injection MAIN for the lower cavity portion 51 increases and the distribution ratio of the fuel spray for the upper cavity portion 52 decreases. In the configuration example in FIG. 11, the fuel spray of the main injection MAIN is distributed at a ratio of 80 for the lower cavity portion 51 and 20 for the upper cavity portion 52. There is a gap between the distribution ratio of the fuel spray of the main injection MAIN and the capacity ratio between the lower cavity portion 51 and the upper cavity portion 52.

The distribution ratio of the fuel spray of the main injection MAIN for the lower cavity portion 51 is larger in the region C than in the region B. Thus, the ECU 10 causes the distribution ratio between the fuel for the lower cavity portion 51 and the fuel for the upper cavity portion 52 to be closer to the capacity ratio by distributing the fuel spray of the pilot injection to the upper cavity portion 52 by a large amount.

Specifically, in the region C, the ECU 10 reduces the number of pilot injections to a number less than that in the region B. By reducing the number of pilot injections, the injection amount per pilot injection increases. In other words, the injection amount of the second pilot injection PI2 in the region C is larger than that of the second pilot injection PI2 in the region B (see FIG. 9). Note that in the region C, the load of the engine 1 is relatively high, and hence the temperature in the combustion chamber 6 is high. Therefore, the ignitability of the fuel is relatively high. Even when the number of pilot injections is reduced, the ignitability of the fuel is secured.

When the number of pilot injections in the region C is to be reduced, the ECU 10 omits the first pilot injection PI1. The interval between the second pilot injection PI2 and/or the third pilot injection PI3 and the main injection MAIN is short. By placing the pilot injection and the main injection to be close to each other, the rapid multi-stage combustion in which the pre-combustion and the main combustion are in succession is realized.

The second pilot injection PI2 in the region C is executed from around −20° to around −10° before the TDC. The timing of the second pilot injection PI2 is the same or substantially the same in the region B and the region C. The penetration of the second pilot injection PI2 in the region C is relatively high because the injection amount is large. The second pilot injection PI2 hits a place near the upper portion of the lip portion 53, and the distribution of the fuel to the upper cavity portion 52 increases. In the configuration example in FIG. 11, the fuel spray of the second pilot injection PI2 is distributed at a ratio of 40 for the lower cavity portion 51 and 60 for the upper cavity portion 52.

In the third pilot injection PI3 in the region C, the injection amount is the same or substantially the same and the injection timing is the same or substantially the same as those of the third pilot injection PI3 in the region B. Therefore, the distribution ratio of the fuel spray of the third pilot injection PI3 is the same in the region B and the region C. In other words, the fuel spray of the third pilot injection PI3 is distributed at a ratio of 65 for the lower cavity portion 51 and 35 for the upper cavity portion 52.

As described above, in the region C, the ECU 10 sets the injection amount per pilot injection to be larger than the injection amount per pilot injection in the region B. As a result, the fuel spray of the pilot injection can be distributed to the upper cavity portion 52 by a large amount. The pilot injection complements the large amount of distribution of the fuel spray of the main injection MAIN to the lower cavity portion 51. The distribution ratio of the fuel between the lower cavity portion 51 and the upper cavity portion 52 becomes equal to the capacity ratio between the lower cavity portion 51 and the upper cavity portion 52. As a result, the waveform of the heat generation rate in the region C becomes the same as the waveform of the heat generation rate in the region B (see FIG. 8).

Note that in the region C, the first after injection AF1 is executed from around +10° to around +15° after the TDC. In the configuration example in FIG. 11, the fuel spray of the first after injection AF1 is distributed at a ratio of 55 for the lower cavity portion 51 and 45 for the upper cavity portion 52. The second after injection AF2 is executed from around +20° to around +30° after the TDC.

Fuel Injection of Region D

Figure 12:
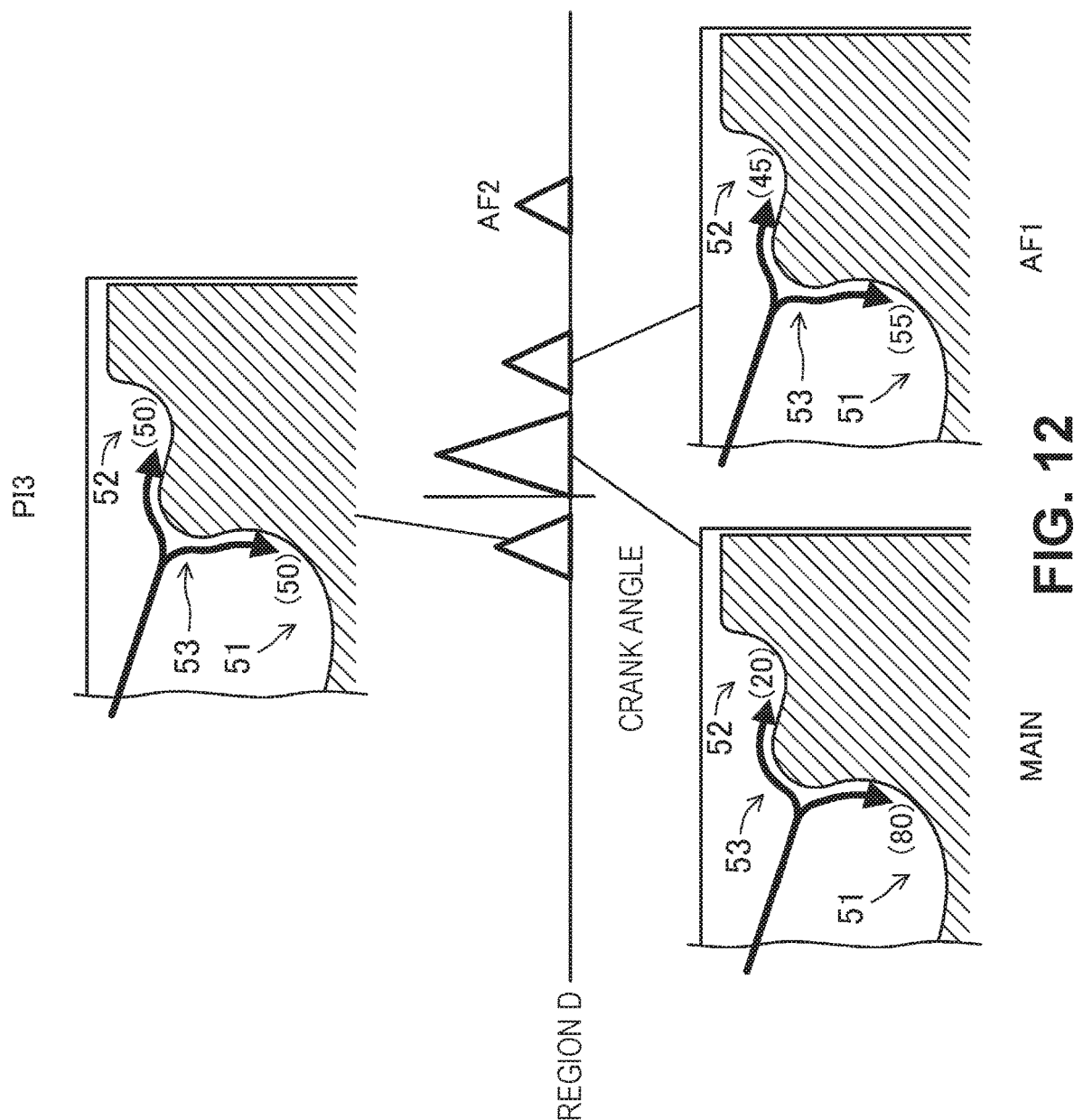
FIG. 12 exemplifies a fuel injection pattern in a region D, and the distribution ratio of the fuel between the upper cavity and the lower cavity in each injection.

FIG. 12 illustrates the pattern of the fuel injection in the region D, and the distribution ratio of the fuel spray between the lower cavity portion 51 and the upper cavity portion 52 for each injection.

The region D is a region in which the load of the engine 1 is higher than that in the region B. Because the load of the engine 1 is high, the total injection amount in the region D is larger than the total injection amount in the region B. The region D is a region in which the speed is higher than that in the region C. The engine 1 is a compression-ignition engine, and hence the total injection amount increases as the speed increases. The total injection amount in the region D is larger than the total injection amount in the region C. The fuel pressure regulator 19 sets the injection pressure in the region D to be higher than the injection pressure in the region C. In the region D, the penetration of the fuel spray is higher than that in the region C. Meanwhile, the boost pressure in the region D is relatively high. The fuel spray scatters less easily in the region D than in the region C.

In the region D, the ECU 10 sequentially executes the third pilot injection PI3, the main injection MAIN, the first after injection AF1, and the second after injection AF2. In the region D, the ignitability of the fuel is high, and hence the number of pilot injections is reduced as compared to the region C.

When the number of pilot injections in the region D is to be reduced, the ECU 10 omits the first pilot injection PI1 and the second pilot injection PI2. The interval between the third pilot injection PI3 and the main injection MAIN is short. By placing the pilot injection and the main injection to be close to each other, a rapid multi-stage combustion in which the pre-combustion and the main combustion are in succession is realized.

The timing of the main injection MAIN in the region D is the same as the timing of the main injection MAIN in the region B, and is a predetermined timing after the TDC (from around 0° to around +10° after the TDC).

In the region D, the penetration of the fuel spray is high. Therefore, the distribution ratio of the fuel spray of the main injection MAIN for the lower cavity portion 51 increases, and the distribution ratio of the fuel spray for the upper cavity portion 52 decreases. In the configuration example in FIG. 12, the fuel spray of the main injection MAIN is distributed at a ratio of 80 for the lower cavity portion 51 and 20 for the upper cavity portion 52.

The distribution ratio of the fuel spray of the main injection MAIN for the lower cavity portion 51 is larger in the region D than in the region B. Thus, the ECU 10 causes the distribution ratio between the fuel for the upper cavity portion 52 and the fuel for the lower cavity portion 51 to be closer to the capacity ratio by distributing the fuel spray of the pilot injection to the upper cavity portion 52 by a larger amount.

Specifically, the injection amount of the third pilot injection PI3 in the region D is larger than those of the third pilot injection PI3 in the region B and the third pilot injection PI3 in the region C (see FIG. 9). The timing of the third pilot injection PI3 in the region C is executed from around −10° to around 0° before the TDC. The timing of the third pilot injection PI3 is the same or substantially the same in the region B, the region C, and the region D. The injection amount of the third pilot injection PI3 in the region D is large, and hence the penetration is relatively high. The fuel spray rapidly reaches the lip portion 53, and hence the fuel spray hits a place near the upper portion of the lip portion 53 and the distribution ratio for the upper cavity portion 52 increases. In the configuration example in FIG. 12, the fuel spray of the third pilot injection PI3 is distributed at a ratio of 50 for the lower cavity portion 51 and 50 for the upper cavity portion 52. The distribution of the fuel to the upper cavity portion 52 is increased as compared to the third pilot injection PI3 in the region B.

As described above, in the region D, the ECU 10 sets the injection amount of the third pilot injection PI3 to be larger than the injection amount of the third pilot injection PI3 in the region B. In the third pilot injection PI3, the injection amount per pilot injection with respect to the total injection amount is large. As a result, the fuel can be distributed to the upper cavity portion 52 by a larger amount. The large amount of distribution of the fuel spray of the main injection MAIN to the lower cavity portion 51 can be complemented, and the distribution ratio of the fuel between the upper cavity portion 52 and the lower cavity portion 51 becomes equal to the capacity ratio between the upper cavity portion 52 and the lower cavity portion 51. As a result, the waveform of the heat generation rate in the region D becomes the same as the waveform of the heat generation rate in the region B (see FIG. 8).

Note that in the region D, the first after injection AF1 is executed from around +10° to around +15° after the TDC. In the configuration example in FIG. 12, the fuel spray of the first after injection AF1 is distributed at a ratio of 55 for the lower cavity portion 51 and 45 for the upper cavity portion 52. The second after injection AF2 is executed from around +20° to around +30° after the TDC.

Fuel Injection of Region A

Figure 13:
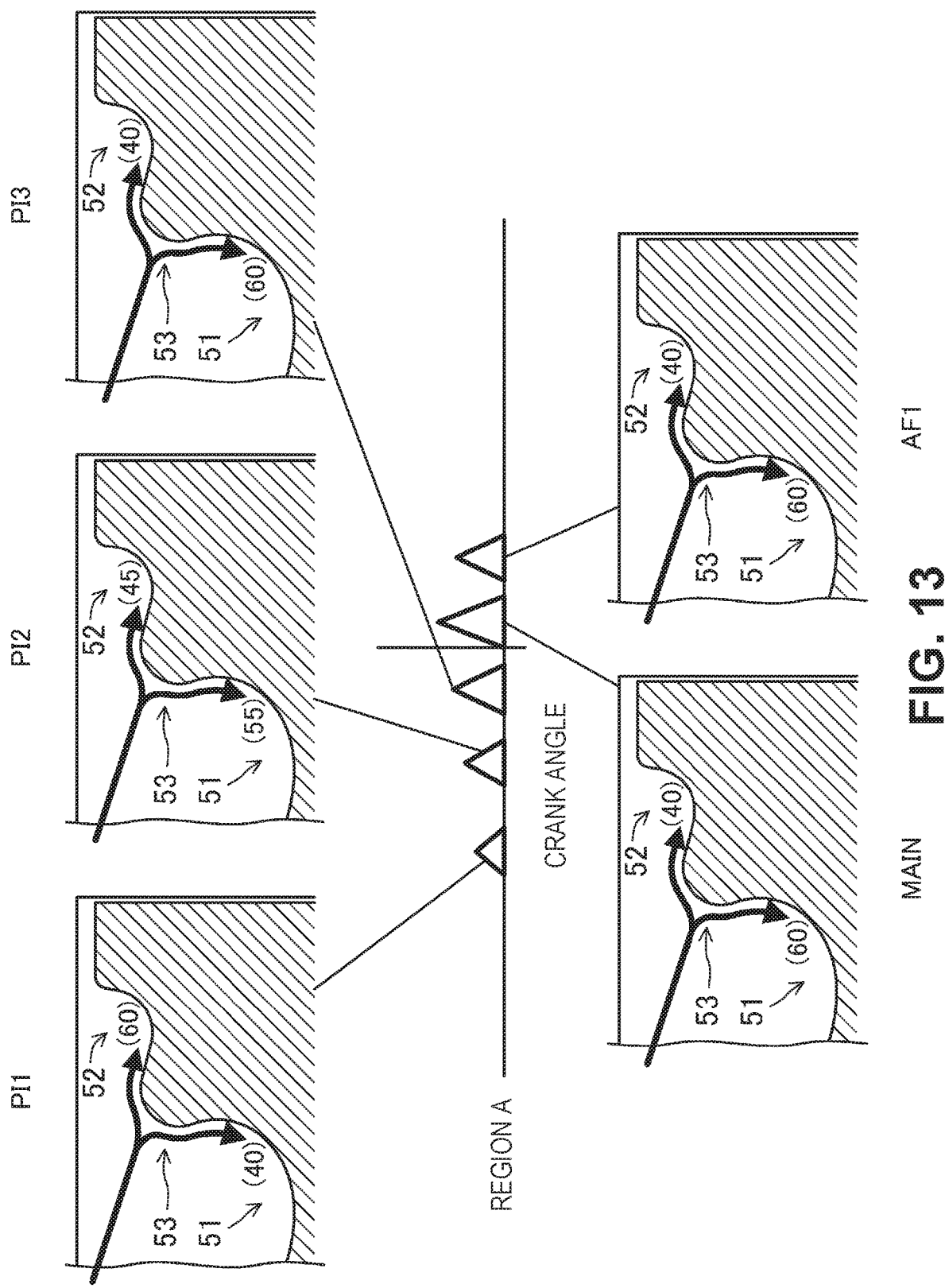
FIG. 13 exemplifies a fuel injection pattern in a region A, and the distribution ratio of the fuel between the upper cavity and the lower cavity in each injection.

FIG. 13 illustrates the pattern of the fuel injection in the region A, and the distribution ratio of the fuel spray between the lower cavity portion 51 and the upper cavity portion 52 for each injection.

The region A is a region in which the load of the engine 1 is lower than that in the region B. Because the load of the engine 1 is low, the total injection amount in the region A is smaller than the total injection amount in the region B. The fuel pressure regulator 19 sets the injection pressure in the region A to be lower than the injection pressure in the region B. In the region A, the penetration of the fuel spray is lower than that in the region B. The region A is a relatively low-speed region. Therefore, the boost pressure is relatively low. The pressure in the combustion chamber 6 is low, and hence the fuel spray easily scatters.

In the region A, the ECU 10 sequentially executes the first pilot injection PI1, the second pilot injection PI2, the third pilot injection PI3, the main injection MAIN, and the first after injection AF1. In the region A, the total injection amount is small, and hence the amount of the air in the combustion chamber 6 is large with respect to the fuel. Therefore, the number of after injections can be reduced. The injection amount of the pilot injection can be increased by the number of after injections that has been reduced. The pilot injection can be performed by being divided into three portions. In the region A in which the load is low, the ignitability of the fuel is secured by performing three pilot injections.

When the injection amounts of the first pilot injection PI1, the second pilot injection PI2, and the third pilot injection PI3 are compared with each other, the injection amount of the first pilot injection PI1 is the smallest, the injection amount of the third pilot injection PI3 is the largest, and the injection amount of the second pilot injection PI2 is therebetween. As a result, as described above, the adherence of the fuel spray of the pilot injection to the wall surface of the combustion chamber 6 can be suppressed.

The timing of the main injection MAIN in the region A is a predetermined timing after the TDC (from around 0° to around +10° after the TDC) as with the timing of the main injection MAIN in the region B.

While the timing of the main injection MAIN in the region A is the same as the timing of the main injection MAIN in the region B, the injection amount of the main injection MAIN in the region A is less than the injection amount of the main injection MAIN in the region B. The penetration of the fuel spray of the main injection MAIN in the region A is relatively low. The time required for the fuel spray to reach the lip portion 53 increases, and hence the fuel spray hits a place near the upper portion of the lip portion 53. The distribution ratio of the fuel spray of the main injection MAIN for the upper cavity portion 52 increases, and the distribution ratio of the fuel spray for the lower cavity portion 51 decreases. In the configuration example in FIG. 13, the fuel spray of the main injection MAIN is distributed at a ratio of 60 for the lower cavity portion 51 and 40 for the upper cavity portion 52. There is a gap between the distribution ratio of the fuel spray of the main injection MAIN and the capacity ratio between the lower cavity portion 51 and the upper cavity portion 52.

In the main injection MAIN in the region A, the distribution ratio of the fuel spray for the upper cavity portion 52 is larger than that in the region B. Thus, the ECU 10 causes the distribution ratio between the fuel for the lower cavity portion 51 and the fuel for the upper cavity portion 52 to be closer to the capacity ratio by distributing the fuel spray of the pilot injection to the lower cavity portion 51 by a larger amount.

Specifically, in the region A, the ECU 10 sets the timings of the first pilot injection PI1 and the second pilot injection PI2 to be later than those in the region B (see FIG. 9). The timing of the first pilot injection PI1 in the region A is around −25° to −20° before the TDC. The timing of the second pilot injection PI2 in the region A is around −15° to −10° before the TDC. Note that the timing of the third pilot injection PI3 in the region A is the same or substantially the same as the timing of the third pilot injection PI3 in the region B.

When the timings of the first pilot injection PI1 and the second pilot injection PI2 are set to be late, the piston 5 is close to the injector 18, and hence the fuel spray hits a place near the lower portion of the lip portion 53. As a result, the distribution amount of the fuel for the lower cavity portion 51 increases. In the configuration example in FIG. 13, the fuel spray of the first pilot injection PI1 is distributed at a ratio of 40 for the lower cavity portion 51 and 60 for the upper cavity portion 52. The fuel spray of the second pilot injection PI2 is distributed at a ratio of 55 for the lower cavity portion 51 and 45 for the upper cavity portion 52. Note that the fuel spray of the third pilot injection PI3 is distributed at a ratio of 60 for the lower cavity portion 51 and 40 for the upper cavity portion 52.

As described above, in the region A, the ECU 10 sets the timing of the pilot injection to be later than the timing of the pilot injection in the region B. As a result, the fuel spray of the pilot injection can be distributed to the lower cavity portion 51 by a large amount. The pilot injection can complement the large amount of distribution of the fuel spray of the main injection MAIN to the upper cavity portion 52, and the distribution ratio of the fuel between the lower cavity portion 51 and the upper cavity portion 52 becomes equal to the capacity ratio between the lower cavity portion 51 and the upper cavity portion 52. As a result, the waveform of the heat generation rate in the region A is the same as the waveform of the heat generation rate in the region B (see FIG. 8).

Note that in the region A, the first after injection AF1 is executed from around +5° to around +15° after the TDC. In the configuration example in FIG. 13, the fuel spray of the first after injection AF1 is distributed at a ratio of 60 for the lower cavity portion 51 and 40 for the upper cavity portion 52.

Fuel Injection in Region E

Figure 14:
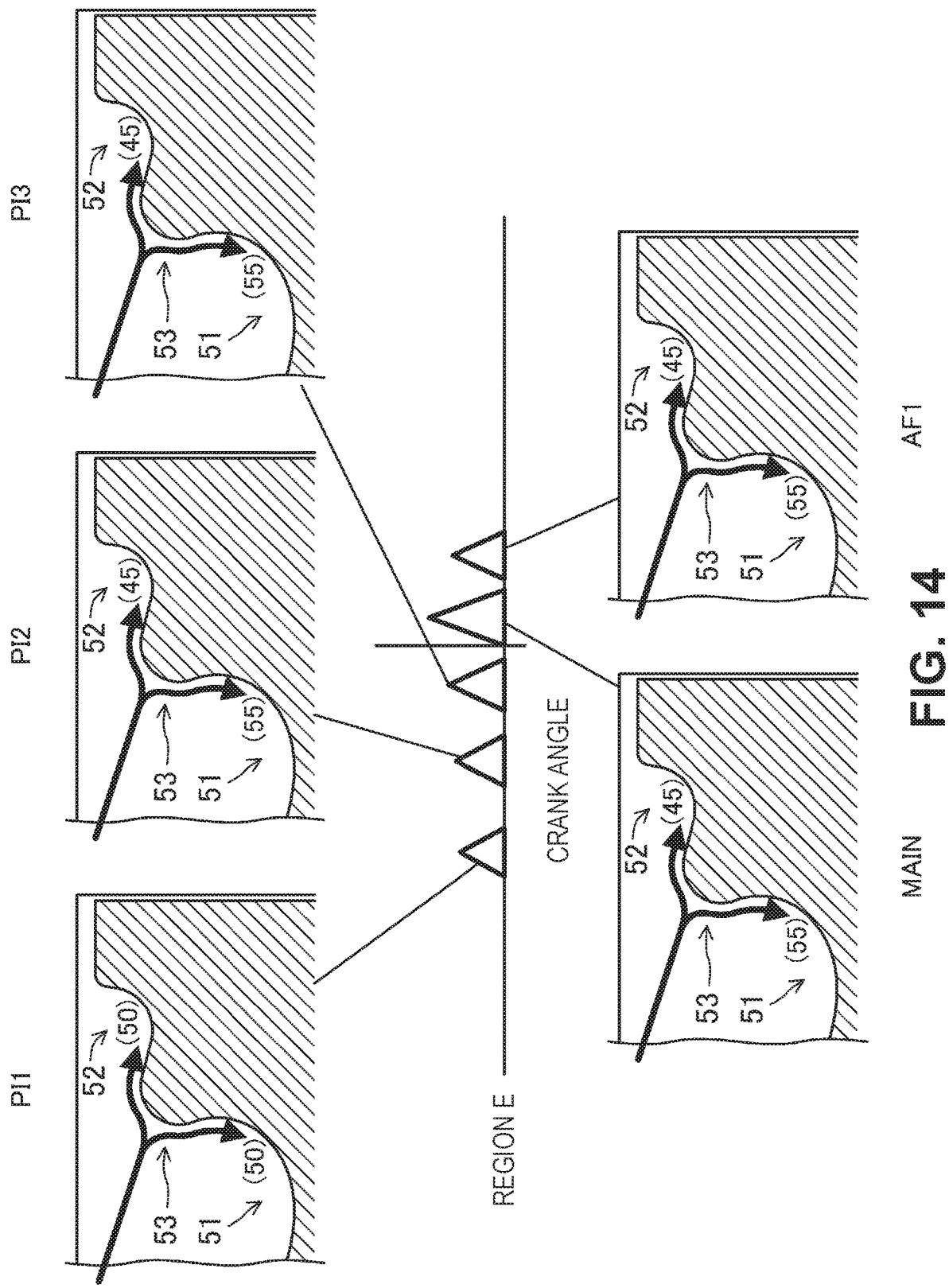
FIG. 14 exemplifies a fuel injection pattern in a region E, and the distribution ratio of the fuel between the upper cavity and the lower cavity in each injection.

FIG. 14 illustrates the pattern of the fuel injection in the region E, and the distribution ratio of the fuel spray between the lower cavity portion 51 and the upper cavity portion 52 for each injection.

The region E is a region in which the load of the engine 1 is lower than that in the region B. Because the load of the engine 1 is low, the total injection amount in the region E is less than the total injection amount in the region B. The fuel pressure regulator 19 sets the injection pressure in the region E to be lower than the injection pressure in the region B. The region E is a region in which the speed is higher than that in the region A. The boost pressure is relatively high, and hence the fuel spray scatters less easily in the region E than in the region A.

In the region E, the ECU 10 sequentially executes the first pilot injection PI1, the second pilot injection PI2, the third pilot injection PI3, the main injection MAIN, and the first after injection AF1. As with the region A, the ignitability of the fuel is secured by reducing the number of after injections and performing the pilot injection three times. When the injection amounts of the first pilot injection PI1, the second pilot injection PI2, and the third pilot injection PI3 are compared with each other, the injection amount of the first pilot injection PI1 is the smallest, the injection amount of the third pilot injection PI3 is the largest, and the injection amount of the second pilot injection PI2 is therebetween. As a result, as described above, the adherence of the fuel spray of the pilot injection to the wall surface of the combustion chamber 6 can be suppressed.

The timing of the main injection MAIN in the region E is the same as the timing of the main injection MAIN in the region B, and is a predetermined timing after the TDC (from around 0° to around +10° after the TDC).

The penetration of the fuel spray in the region E is relatively low, and hence the distribution ratio of the fuel spray of the main injection MAIN for the upper cavity portion 52 increases and the distribution ratio of the fuel spray for the lower cavity portion 51 decreases. In the configuration example in FIG. 14, the fuel spray of the main injection MAIN is distributed at a ratio of 55 for the lower cavity portion 51 and 45 for the upper cavity portion 52.

In the region E, the distribution ratio of the fuel spray of the main injection MAIN for the upper cavity portion 52 is larger than that in the region B. Thus, the ECU 10 causes the distribution ratio between the fuel for the upper cavity portion 52 and the fuel for the lower cavity portion 51 to be closer to the capacity ratio by distributing the fuel spray of the pilot injection to the lower cavity portion 51 by a larger amount.

Specifically, the ECU 10 sets the timings of the first pilot injection PI1 and the second pilot injection PI2 in the region E to be later than those of the first pilot injection PI1 and the second pilot injection PI2 in the region B (see FIG. 9). The timing of the first pilot injection PI1 in the region E is from around −25° to around −20° before the TDC. The timing of the second pilot injection PI2 is from around −15° to around −10° before the TDC. Note that the timing of the third pilot injection PI3 in the region E is the same or substantially the same as the timing of the third pilot injection PI3 in the region B.

The injection amount of the first pilot injection PI1 in the region E is larger than that of the first pilot injection PI1 in the region A, and the injection amount of the second pilot injection PI2 in the region E is larger than that of the second pilot injection PI2 in the region A. The speed in the region E is higher than that in the region A, and hence the total injection amount in the region E is larger than the total injection amount in the region A. The amount by which the total injection amount increases may be allocated to the increase amount of the first pilot injection PI1 and the second pilot injection PI2.

By increasing the injection amount of the pilot injection as compared to the region A, the fuel spray proceeds by overcoming the relatively high pressure in the combustion chamber 6. By setting the timings of the first pilot injection PI1 and the second pilot injection PI2 to be late, the distribution amount of the fuel for the lower cavity portion 51 increases as described above. In the configuration example in FIG. 14, the fuel spray of the first pilot injection PI1 is distributed at a ratio of 50 for the lower cavity portion 51 and 50 for the upper cavity portion 52. The fuel spray of the second pilot injection PI2 is distributed at a ratio of 55 for the lower cavity portion 51 and 45 for the upper cavity portion 52. Note that the fuel spray of the third pilot injection PI3 is distributed at a ratio of 55 for the lower cavity portion 51 and 45 for the upper cavity portion 52.

When the injection amount of the first to third pilot injections PI1 to PI3 in the region E and the injection amount of the first to third pilot injections PI1 to PI3 in the region B are compared with each other, the injection amount of the first to third pilot injections PI1 to PI3 in the region E is larger than the injection amount of the first to third pilot injections PI1 to PI3 in the region B. In the region E, the ratio of the injection amount per pilot injection to the total injection amount is relatively larger.

In the region E, the load is lower than that in the region B, and hence the total injection amount is small. Accordingly, the injection amount of the pilot injection is also small. The penetration of the fuel spray of the pilot injection in the region E becomes lower, and the fuel spray is less easily scattered. Thus, the injection amount per pilot injection is increased so that the ratio of the injection amount per pilot injection to the total injection amount increases. As a result, in the region E, the penetration of the fuel spray for each pilot injection increases. The fuel spray of each pilot injection is distributed for the lower cavity portion 51 and the upper cavity portion 52 at a desired ratio.

In the region E, the ECU 10 sets the timing of the pilot injection to be later than the timing of the pilot injection in the region B, and increases the ratio of the injection amount per pilot injection to the total injection amount. As a result, the fuel spray of the pilot injection can be distributed to the lower cavity portion 51 by a large amount. The fuel spray of the main injection MAIN can complement the large amount of distribution of the upper cavity portion 52, and the distribution ratio of the fuel between the lower cavity portion 51 and the upper cavity portion 52 becomes equal to the capacity ratio between the lower cavity portion 51 and the upper cavity portion 52. As a result, the waveform of the heat generation rate in the region E becomes the same as the waveform of the heat generation rate in the region B (see FIG. 8).

Note that in the region E, the first after injection AF1 is executed from around +5° to around +15° after the TDC. In the configuration example in FIG. 14, the fuel spray of the first after injection AF1 is distributed at a ratio of 55 for the lower cavity portion 51 and 45 for the upper cavity portion 52.

Comparison of Fuel Injection Patterns for Direction of Load

The regions C and D are regions in which the load of the engine 1 is higher than those in the regions A, B, and E. The distribution of the fuel to the lower cavity portion 51 is larger in the main injection MAIN in the regions C and D than in the main injection MAIN in the regions A, B, and E. Thus, in the regions C and D, the ECU 10 sets the distribution ratio of the fuel spray of the pilot injection for the upper cavity portion 52 to be larger than that in the regions A, B, and E. Specifically, the ECU 10 causes the number of pilot injections in the regions C and D to be less than that in the regions A, B, and E. The number of pilot injections in the regions A, B, and E is three. The number of pilot injections in the region C is two. The number of pilot injections in the region D is one. In the regions C and D, the injection amount per pilot injection with respect to the total injection amount increases, and hence the distribution of the fuel spray of the pilot injection to the upper cavity portion 52 increases.

The regions A and E are regions in which the load of the engine 1 is lower than that in the region B. In the main injection MAIN in the regions A and E, the distribution of the fuel to the upper cavity portion 52 increases as compared to the main injection MAIN in the region B. In other words, in the main injection MAIN in the region B, the distribution of the fuel to the lower cavity portion 51 increases as compared to the main injection MAIN in the regions A and E. Thus, in the region B, the ECU 10 sets the timing of the pilot injection to be earlier than that in the regions A and E. In the region B, when the pilot injection is executed, the piston 5 and the injector 18 are separated from each other. Therefore, the fuel spray of the pilot injection is distributed to the upper cavity portion 52 by a larger amount.

When the region A, the region B, and the region C that are low-speed regions in the rapid multi-stage combustion region are compared with each other, the region A is a region in which the load of the engine 1 is lower than that in the region B, and the region C is a region in which the load of the engine 1 is higher than that in the region B.

The ECU 10 sets the timing of the first pilot injection (that is, the first pilot injection PI1) in the region A to be later than that in the region B. As a result, the fuel spray of the pilot injection is distributed to the lower cavity portion 51 by a larger amount.

The ECU 10 sets the number of pilot injections in the region C to be lower than that in the region B. As described above, the distribution of the fuel spray of the pilot injection to the upper cavity portion 52 can be increased.

When the region E, the region B, and the region D that are high-speed regions in the rapid multi-stage combustion region are compared with each other, the region E is a region in which the load of the engine 1 is lower than that in the region B, and the region D is a region in which the load of the engine 1 is higher than that in the region B.

The ECU 10 sets the timing of the first pilot injection (that is, the first pilot injection PI1) in the region E to be later than that in the region B. As a result, the fuel spray of the pilot injection can be distributed to the lower cavity portion 51 by a larger amount.

The ECU 10 sets the number of pilot injections in the region D to be lower than that in the region B. The distribution of the fuel spray of the pilot injection to the upper cavity portion 52 can be increased.

Comparison of Fuel Injection Patterns for Direction of Speed

The region E is a region in which the speed is higher than that in the region A. In the region E, the ECU 10 maintains the injection amount of the main injection and increases the injection amount of the pilot injection for the region A. In other words, the ECU 10 sets the ratio of the injection amount per pilot injection to the total injection amount in the region A to be lower than that in the region E.

In more detail, the ECU 10 sets the injection amount of each of the first pilot injection PI1 and the second pilot injection PI2 in the region E to be larger than that in the region A. The injection amount of the pilot injection is smaller than that of the main injection. In the region A and the region E, the load is lower than that in the region B, and hence the total injection amount is small. The injection amount of the pilot injection in each of the region A and the region E is even smaller. In the region A and the region E, the penetration of the fuel spray of the pilot injection is low. Out of the region A and the region E, the engine speed in the region E is high, and hence the pressure in the combustion chamber 6 is high in the region E. The fuel spray of the pilot injection scatters even less easily. There is a concern that the fuel spray of the pilot injection in the region E is distributed to the lower cavity portion 51 by a larger amount as compared to the region A.

Thus, the ECU 10 sets the injection amount of each of the first pilot injection PI1 and the second pilot injection PI2 in the region E to be larger than that in the region A. As a result, in the region E, the fuel spray of the first pilot injection PI1 and the second pilot injection PI2 overcomes the high pressure in the combustion chamber 6 and rapidly reaches the lip portion 53. The fuel spray is distributed to the upper cavity portion 52 by a large amount. In the pilot injection performed at a particularly early timing, the piston 5 is separated from the injector 18, and hence the distribution ratio of the fuel for the upper cavity portion 52 is larger than that in the pilot injection performed at a later timing. By the increase of the injection amount of the first pilot injection PI1 and the second pilot injection PI2, the fuel can be distributed to the upper cavity portion 52 by a larger amount in the pilot injection.

As a result, the distribution ratio of the fuel spray of the pilot injection between the lower cavity portion 51 and the upper cavity portion 52 can be substantially the same in the region A and the region E. The distribution ratio of the fuel spray of the main injection between the lower cavity portion 51 and the upper cavity portion 52 is slightly different in the region A and the region E, but the difference in the distribution ratio of the fuel spray of the main injection can be complemented by adjusting the distribution ratio of the fuel spray of the pilot injection. As a result, in the region A and the region E, the distribution ratio of the fuel spray of the pilot injection and the main injection between the lower cavity portion 51 and the upper cavity portion 52 can be substantially the same.

The region D is a region in which the speed is higher than that in the region C. The ECU 10 sets the injection ratio per pilot injection in the region D to be larger than that in the region C. More specifically, the ECU 10 increases the injection amount of the third pilot injection PI3.

In the region D, the load is higher than that in the region B and the speed is high. Therefore, the boost pressure increases and the pressure in the combustion chamber 6 is high. Therefore, the fuel spray of the pilot injection of which the injection amount is small scatters less easily.

Thus, the ECU 10 sets the number of pilot injections in the region D to be lower than that in the region C, and increases the injection amount of the third pilot injection PI3. As a result, in the region D, the fuel spray of the third pilot injection PI3 overcomes the high pressure in the combustion chamber 6 and rapidly reaches the lip portion 53, and the distribution of the fuel to the upper cavity portion 52 increases (see PI3 in FIG. 11 and PI3 in FIG. 12). As a result, the distribution ratio of the fuel spray of the pilot injection between the lower cavity portion 51 and the upper cavity portion 52 can be substantially the same in the region C and the region D. In the region C and the region D, the distribution ratio of the fuel spray of the pilot injection and the main injection between the lower cavity portion 51 and the upper cavity portion 52 can be substantially the same.

Control Procedure of Fuel Injection

Figure 15A:
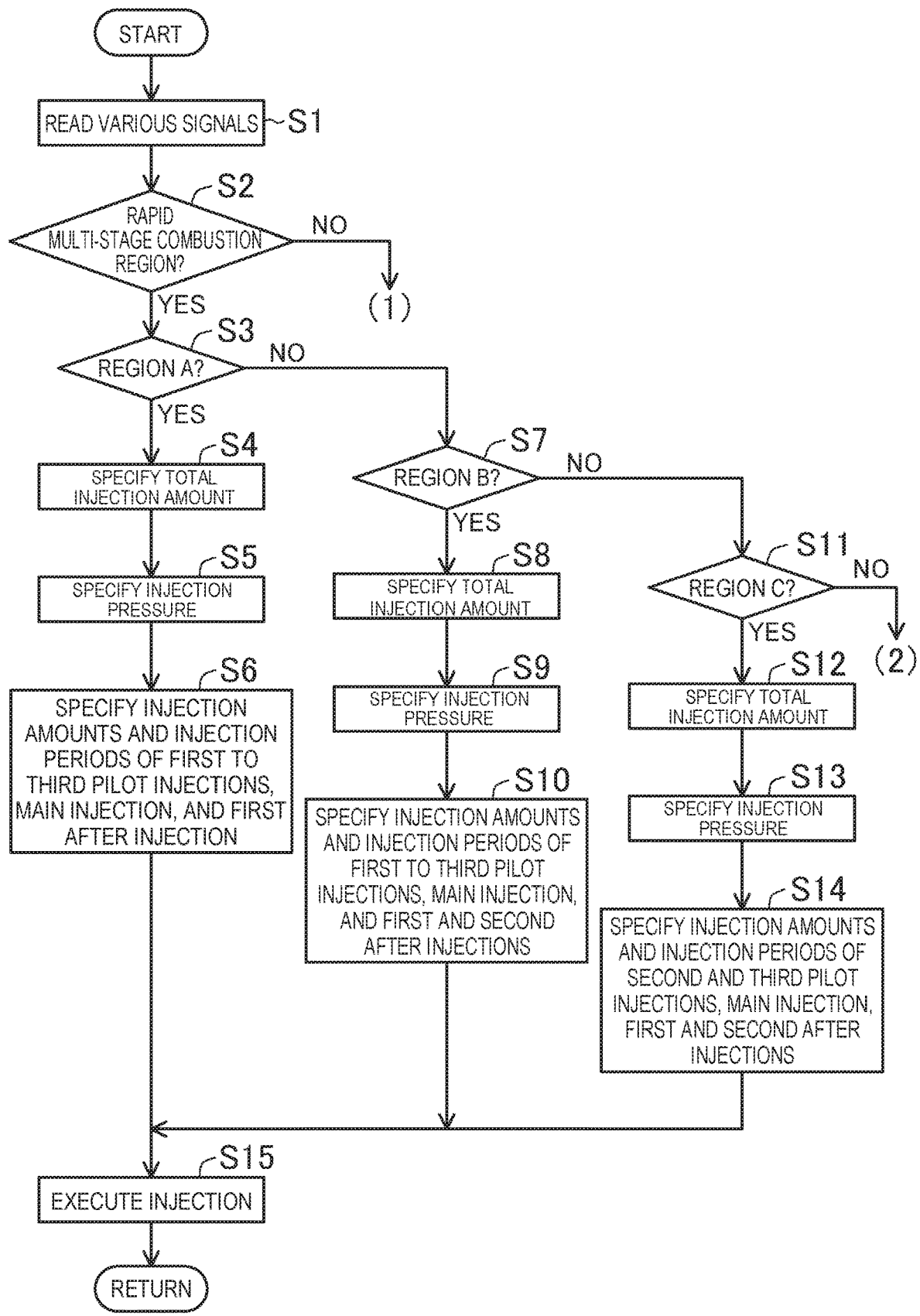
FIG. 15A is a flow chart exemplifying a part of a control procedure according to the fuel injection executed by the ECU.
Figure 15B:
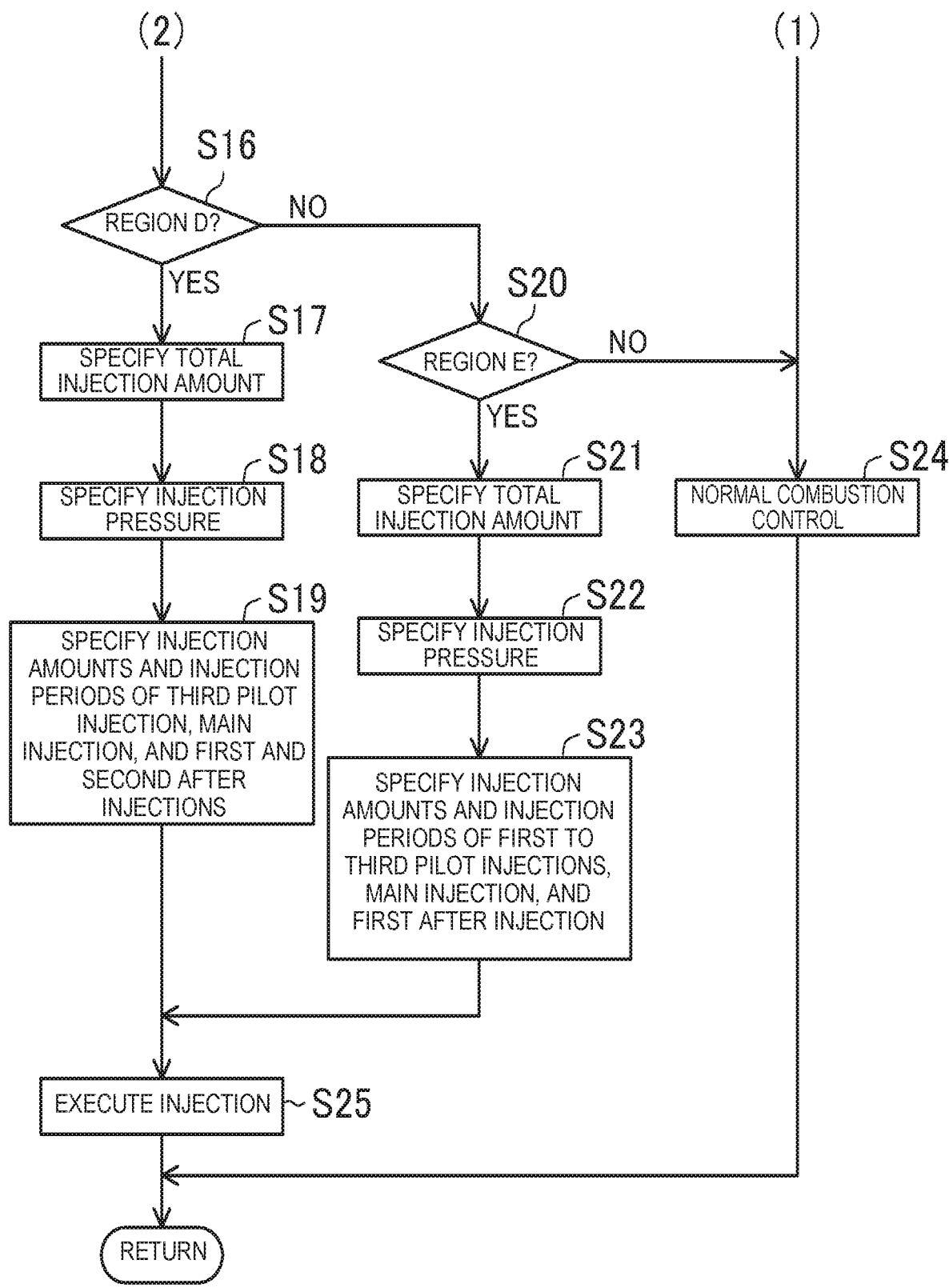
FIG. 15B is a flow chart exemplifying a part of the control procedure according to the fuel injection executed by the ECU.

FIG. 15A and FIG. 15B illustrate a flow chart according to the control of the injector 18 and the fuel pressure regulator 19 executed by the fuel injection control module 71 of the ECU 10. In Step S1, the ECU 10 reads detection signals of the sensors SN1 to SN12. In subsequent Step S2, the operational state determination module 72 determines whether the operational state of the engine 1 is in the rapid multi-stage combustion region. When the determination in Step S2 is YES, the process proceeds to Step S3. When the determination in Step S2 is NO, the process proceeds to Step S24.

In Step S3, the operational state determination module 72 determines whether the operational state of the engine 1 is in the region A. When the determination in Step S3 is YES, the process proceeds to Step S4. When the determination in Step S3 is NO, the process proceeds to Step S7.

In Step S4, the injection setting module 74 specifies the total injection amount corresponding to the operational state of the engine 1. In subsequent Step S5, the injection setting module 74 specifies the injection pressure corresponding to the specified total injection amount. Then, in Step S6, the injection pattern selection module 73 selects the injection pattern corresponding to the operational state of the engine 1, and the injection setting module 74 specifies the injection amounts and the injection timings of the first pilot injection PI1, the second pilot injection PI2, the third pilot injection PI3, the main injection MAIN, and the first after injection AF1. Then, in Step S15, the fuel injection control module 71 outputs a control signal to the injector 18 and causes the injector 18 to execute the fuel injection (see FIG. 13).

In Step S7, the operational state determination module 72 determines whether the operational state of the engine 1 is in the region B. When the determination in Step S7 is YES, the process proceeds to Step S8. When the determination in Step S7 is NO, the process proceeds to Step S11.

In Step S8, as in Step S4, the injection setting module 74 specifies the total injection amount corresponding to the operational state of the engine 1. In subsequent Step S9, as in Step S5, the injection setting module 74 specifies the injection pressure corresponding to the specified total injection amount. Then, in Step S10, the injection pattern selection module 73 selects the injection pattern corresponding to the operational state of the engine 1, and the injection setting module 74 specifies the injection amounts and the injection timings of the first pilot injection PI1, the second pilot injection PI2, the third pilot injection PI3, the main injection MAIN, the first after injection AF1, and the second after injection AF2. Then, in Step S15, the fuel injection control module 71 outputs a control signal to the injector 18, and causes the injector 18 to execute the fuel injection (see FIG. 10).

In Step S11, the operational state determination module 72 determines whether the operational state of the engine 1 is in the region C. When the determination in Step S11 is YES, the process proceeds to Step S12. When the determination in Step S11 is NO, the process proceeds to Step S16.

In Step S12, as in Step S4, the injection setting module 74 specifies the total injection amount corresponding to the operational state of the engine 1. In subsequent Step S13, as in Step S5, the injection setting module 74 specifies the injection pressure corresponding to the specified total injection amount. Then, in Step S14, the injection pattern selection module 73 selects the injection pattern corresponding to the operational state of the engine 1, and the injection setting module 74 specifies the injection amounts and the injection timings of the second pilot injection PI2, the third pilot injection PI3, the main injection MAIN, the first after injection AF1, and the second after injection AF2. Then, in Step S15, the fuel injection control module 71 outputs a control signal to the injector 18, and causes the injector 18 to execute the fuel injection (see FIG. 11).

In Step S16, the operational state determination module 72 determines whether the operational state of the engine 1 is in the region D. When the determination in Step S16 is YES, the process proceeds to Step S17. When the determination in Step S16 is NO, the process proceeds to Step S20.

In Step S17, as in Step S4, the injection setting module 74 specifies the total injection amount corresponding to the operational state of the engine 1. In subsequent Step S18, as in Step S5, the injection setting module 74 specifies the injection pressure corresponding to the specified total injection amount. Then, in Step S19, the injection pattern selection module 73 selects the injection pattern corresponding to the operational state of the engine 1, and the injection setting module 74 specifies the injection amounts and the injection timings of the third pilot injection PI3, the main injection MAIN, the first after injection AF1, and the second after injection AF2. Then, in Step S25, the fuel injection control module 71 outputs a control signal to the injector 18, and causes the injector 18 to execute the fuel injection (see FIG. 12).

In Step S20, the operational state determination module 72 determines whether the operational state of the engine 1 is in the region E. When the determination in Step S20 is YES, the process proceeds to Step S21. When the determination in Step S20 is NO, the process proceeds to Step S24.

In Step S21, as in Step S4, the injection setting module 74 specifies the total injection amount corresponding to the operational state of the engine 1. In subsequent Step S22, as in Step S5, the injection setting module 74 specifies the injection pressure corresponding to the specified total injection amount. Then, in Step S23, the injection pattern selection module 73 selects the injection pattern corresponding to the operational state of the engine 1, and the injection setting module 74 specifies the injection amounts and the injection timings of the first pilot injection PI1, the second pilot injection PI2, the third pilot injection PI3, the main injection MAIN, and the first after injection AF1. Then, in Step S25, the fuel injection control module 71 outputs a control signal to the injector 18, and causes the injector 18 to execute the fuel injection (see FIG. 14).

In Step S24, the fuel injection control module 71 executes a normal combustion control that is different from the rapid multi-stage combustion described above, and the process returns.

Note that the engine 1 and the combustion chamber 6 to which the technology disclosed herein can be applied are not limited to the abovementioned configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (controller)

11a Cylinder
18 Injector (fuel injection valve)
19 Fuel pressure regulator
47 Turbocharger
5 Piston
6 Combustion chamber
50 Cavity
51 Lower cavity portion
52 Upper cavity portion
53 Lip portion
AX Injection axis
SN1 Crank angle sensor
SN2 Water temperature sensor
SN3 Air flow sensor
SN4 Intake air temperature sensor
SN5 Intake air pressure sensor
SN6 Intake air $O_2$ sensor
SN7 Injection pressure sensor
SN8 Exhaust gas $O_2$ sensor
SN9 Differential pressure sensor
SN10 Accelerator opening sensor
SN11 Atmosphere pressure sensor
SN12 Outside air temperature sensor
MAIN Main injection
PI1 First pilot injection
PI2 Second pilot injection
PI3 Third pilot injection

What is claimed is:

1. An engine system comprising:
a piston that is internally inserted in a cylinder of an engine and moves back and forth in the cylinder;
a fuel injection valve that is disposed on a top surface of a combustion chamber formed by the cylinder and the piston, and injects a fuel spray along an injection axis;
a plurality of sensors that output measurement signals in accordance with various parameters relating to operation of the engine;
a controller that receives the measurement signals of the plurality of sensors, and outputs a control signal to the fuel injection valve in accordance with an operational state defined by a speed and a load of the engine determined from the measurement signals; and
a fuel pressure regulator that increases an injection pressure of the fuel when a total injection amount of the fuel injected to the combustion chamber during one combustion cycle increases, wherein
the piston comprises:
 a lower cavity provided in a central portion of a top surface of the piston in a radial direction;
 an upper cavity that is provided around the lower cavity and is shallower than the lower cavity; and
 a lip portion between the lower cavity and the upper cavity,
the controller causes the fuel injection valve to execute a main injection performed near a compression top dead center, and at least one pilot injection performed during the compression stroke when the engine operates in a first state and a second state in which the load is lower than the load in the first state,
the main injection and the at least one pilot injection distribute the fuel spray to the lower cavity and the upper cavity by directing the injection axis to the lip portion in at least one part of an injection period, and
the controller sets a timing of the at least one pilot injection in such a manner that a distribution ratio of the fuel spray of the at least one pilot injection for the lower cavity is higher when the engine operates in the second state than when the engine operates in the first state.

2. The engine system according to claim 1, wherein the controller sets the timing of the at least one pilot injection to be later when the engine operates in the second state than when the engine operates in the first state.

3. The engine system according to claim 1, wherein the controller causes a ratio of an injection amount per pilot injection to the total injection amount to be higher when the engine operates in the second state than when the engine operates in the first state.

4. The engine system according to claim 3, further comprising a turbocharger that boosts intake air by exhaust energy of the engine, wherein the controller causes the ratio of the injection amount per pilot injection to the total injection amount to be lower when the engine operates in a third state than when the engine operates in the second state, the third state being a state in which the load is lower than the load in the first state and the speed is lower than the speed in the second state.

5. The engine system according claim 1, wherein the controller causes the main injection to be executed at a predetermined timing after the compression top dead center when the engine operates in the first state and when the engine operates in the second state.

6. The engine system according to claim 5, wherein
the lower cavity has a larger capacity than the upper cavity, and
the controller sets the timing of the main injection in such a manner that the fuel spray of the main injection is distributed in correspondence to a capacity ratio between the upper cavity and the lower cavity when the engine operates in the first state.

7. The engine system according to claim 1, wherein
the plurality of sensors include a crank angle sensor, and
the controller is configured to determine the speed of the engine from the measurement signal received from the crank angle sensor.

8. The engine system according to claim 1, wherein
the plurality of sensors include an accelerator opening sensor, and
the controller is configured to determine the load of the engine from the measurement signal received from the accelerator opening sensor.

9. The engine system according to claim 1, wherein the timing of the at least one pilot injection includes a start timing.

10. The engine system according to claim 1, wherein the timing of the at least one pilot injection includes an end timing.

* * * * *